United States Patent [19]
Egawa

[11] Patent Number: 5,307,113
[45] Date of Patent: Apr. 26, 1994

[54] IMAGING APPARATUS WITH MEANS FOR DETECTING AND PREVENTING HAND SHAKE

[75] Inventor: Akira Egawa, Tokyo, Japan

[73] Assignee: Canon Kabushiki Kaisha, Tokyo, Japan

[21] Appl. No.: 939,412

[22] Filed: Sep. 3, 1992

Related U.S. Application Data

[63] Continuation of Ser. No. 581,687, Sep. 13, 1990, abandoned, which is a continuation of Ser. No. 501,378, Mar. 29, 1990, abandoned, which is a continuation of Ser. No. 392,266, Aug. 10, 1989, abandoned, which is a continuation of Ser. No. 316,580, Feb. 28, 1989, abandoned, which is a continuation of Ser. No. 232,547, Aug. 12, 1988, abandoned, which is a continuation of Ser. No. 121,686, Nov. 17, 1987, abandoned.

[30] Foreign Application Priority Data

Nov. 20, 1986 [JP] Japan ............................ 61-275437
Nov. 20, 1986 [JP] Japan ............................ 61-275438
Nov. 20, 1986 [JP] Japan ............................ 61-275439
Nov. 20, 1986 [JP] Japan ............................ 61-275440

[51] Int. Cl.$^5$ .............................................. G03B 17/40
[52] U.S. Cl. ..................................... 354/430; 354/266
[58] Field of Search ............. 354/430, 266, 237, 238.1, 354/239, 195.1, 195.12, 400, 401, 402, 403, 408, 409, 267.1; 358/105, 222; 359/554

[56] References Cited

U.S. PATENT DOCUMENTS

| | | | |
|---|---|---|---|
| 4,021,825 | 5/1977 | McCann et al. | 354/238.1 |
| 4,027,317 | 5/1977 | Hauser et al. | 354/289.1 |
| 4,222,645 | 9/1980 | Imura et al. | 354/239 X |
| 4,320,948 | 3/1982 | Hosoe et al. | 354/430 |
| 4,348,089 | 9/1982 | Shenk | 354/195.1 |
| 4,448,510 | 5/1984 | Murakoshi et al. | 354/289.12 |
| 4,527,053 | 7/1985 | Kinoshita et al. | 354/406 X |
| 4,564,277 | 1/1986 | Koch et al. | 354/412 X |
| 4,673,276 | 6/1987 | Yoshida et al. | 354/430 |
| 4,774,538 | 9/1988 | Kawai | 354/402 |
| 4,788,596 | 11/1988 | Kawakami | 358/222 |
| 4,943,825 | 7/1990 | Taniguchi et al. | 354/106 X |

Primary Examiner—W. B. Perkey
Attorney, Agent, or Firm—Robin, Blecker, Daley & Driscoll

[57] ABSTRACT

The present patent application discloses an imaging apparatus having actuating means for starting picking-up of an image, image blur detecting means for detecting the blurring state of the image resulting from the operation of the actuating means, and setting means responsive to the output of the image blur detecting means for setting a time which lasts until an image recording starts.

49 Claims, 32 Drawing Sheets (NEAR DISTANCE)

(MIDDLE DISTANCE)

(FAR DISTANCE)

IMAGING APPARATUS WITH MEANS FOR DETECTING AND PREVENTING HAND SHAKE

This is a continuation application under 37 CFR 1.62 of prior application Ser. No. 581,687, filed Sep. 13, 1990, (now abandoned) which is a continuation of Ser. No. 501,378, filed on Mar. 29, 1990, (now abandoned), which is a continuation of Ser. No. 392,266, filed Aug. 10, 1989, (now abandoned), which is a continuation of Ser. No. 316,580, filed on Feb. 28, 1989, (now abandoned), which is a continuation of Ser. No. 232,547, filed on Aug. 12, 1988, (now abandoned), which is a continuation of Ser. No. 121,686, filed Nov. 17, 1987, (now abandoned).

BACKGROUND OF THE INVENTION

1. Field of the Invention

This invention relates to an imaging apparatus capable of preventing the influence of the hand shake.

2. Description of the Related Art

To prevent the influence of photographer's hand shake on the image sharpness in the camera, the generally considered methods are to use the flash unit, or to stabilize the image by means of a gyroscope, or by moving the lens to correct the optical axis. In the case of using the flash unit, however, there were problems in that a far distant object could not be shot, and that the color temperature of the film used did not match the flash lighting situation, and others.

Also, concerning the second method, there will be considered problems in that the gyroscope must be rotated to ready the camera for shot that the gyroscopic errect makes it difficult for the photographer to make an intended change of the composition. In the case of the third method, to move the optical axis of the camera lens takes so long a time that it cannot catch up the speed of the hand shake.

SUMMARY OF THE INVENTION

The present invention has been made to eliminate such conventional drawbacks as described above and to provide an imaging apparatus capable of preventing the hand shake from influencing a photograph to be taken. In an embodiment of the invention, the apparatus is provided with operating means upon actuation to start a picking-up of an image, means responsive to actuation of the operating means for detecting the blurring state of the image, and setting means responsive to the output of the image blur detecting means for determining a time up to start an image recording, whereby the image recording operation is deferred pending the settlement of the image blurring. Thus, the influence of the hand shake can be prevented.

Other objects of the invention will become apparent from the following description of embodiments thereof.

DETAILED DESCRIPTION OF THE PREFERRED EMBODIMENTS

The present invention is next described in detail in connection with the embodiments thereof by reference to the drawings.

Figure 2:
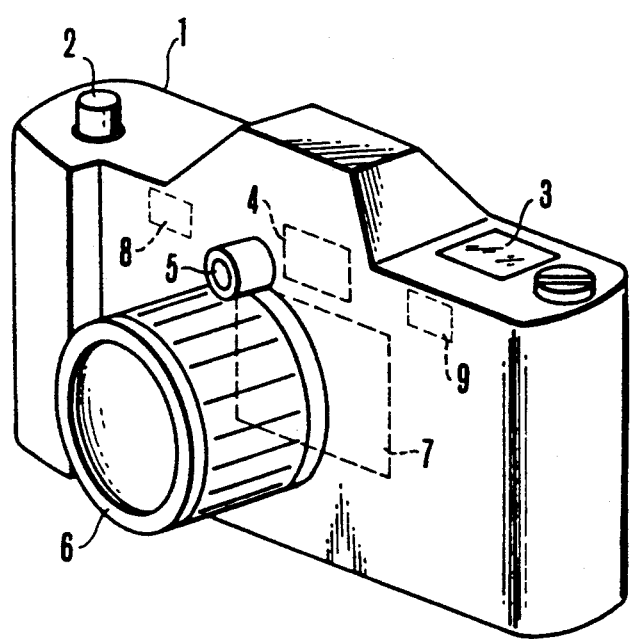
FIG. 2 is a perspective view illustrating an example of the outer appearance in the first embodiment of the invention.

FIG. 2 shows an example of the outer appearance in the first embodiment.

In FIG. 2, a camera body 1 is shown having a shutter release button 2 for indicating a shot. Display means 3 displays an image of an object to be photographed and is of the liquid crystal display (LCD) type. A light receiving element 4 for picking up an image formed with light coming from the object is in the form of an area sensor using the solid state image pickup element (CCD). An optical system 5 for the CCD 4 focuses the object image on the CCD 4.

A photographic optical system 6 forms the same object image on the film as that on the CCD 4. A light emitter (IRED) 8 and a photosensitive element (PSD) 9 constitute part of a device for measuring the distance from the camera to the object by the principle of trigonometry survey.

Figure 3:
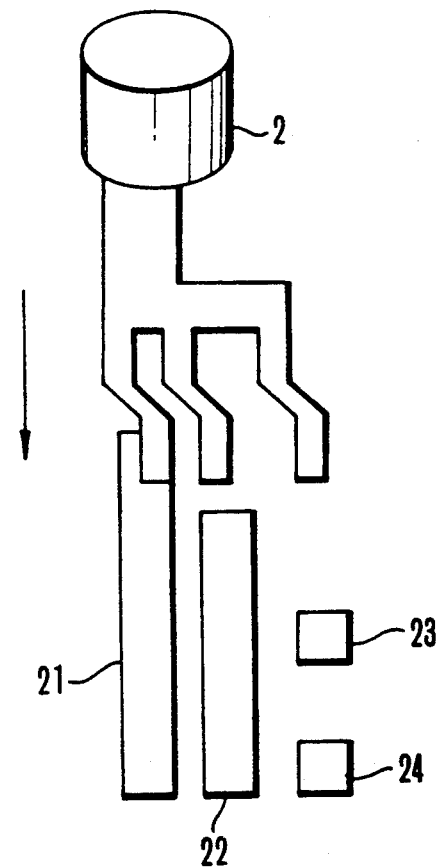
FIG. 3 is a schematic view of showing the construction of switches 22, 23 and 24 responsive to the strokes of a release button 2 in the first embodiment of the invention.

FIG. 3 shows the construction and arrangement of the elements of three switches cooperative with the release button 2 in this embodiment. The switches have a common contact 21. When the photographer pushes down the button 2 to a first stroke, electrical connection is established between the contact 21 and a contact 22. Upon further depression of the button 2 to a second stroke, another contact 23 is connected to contact 21, and, by a third stroke, still another contact 24 is connected to the contact 21.

Figure 1:
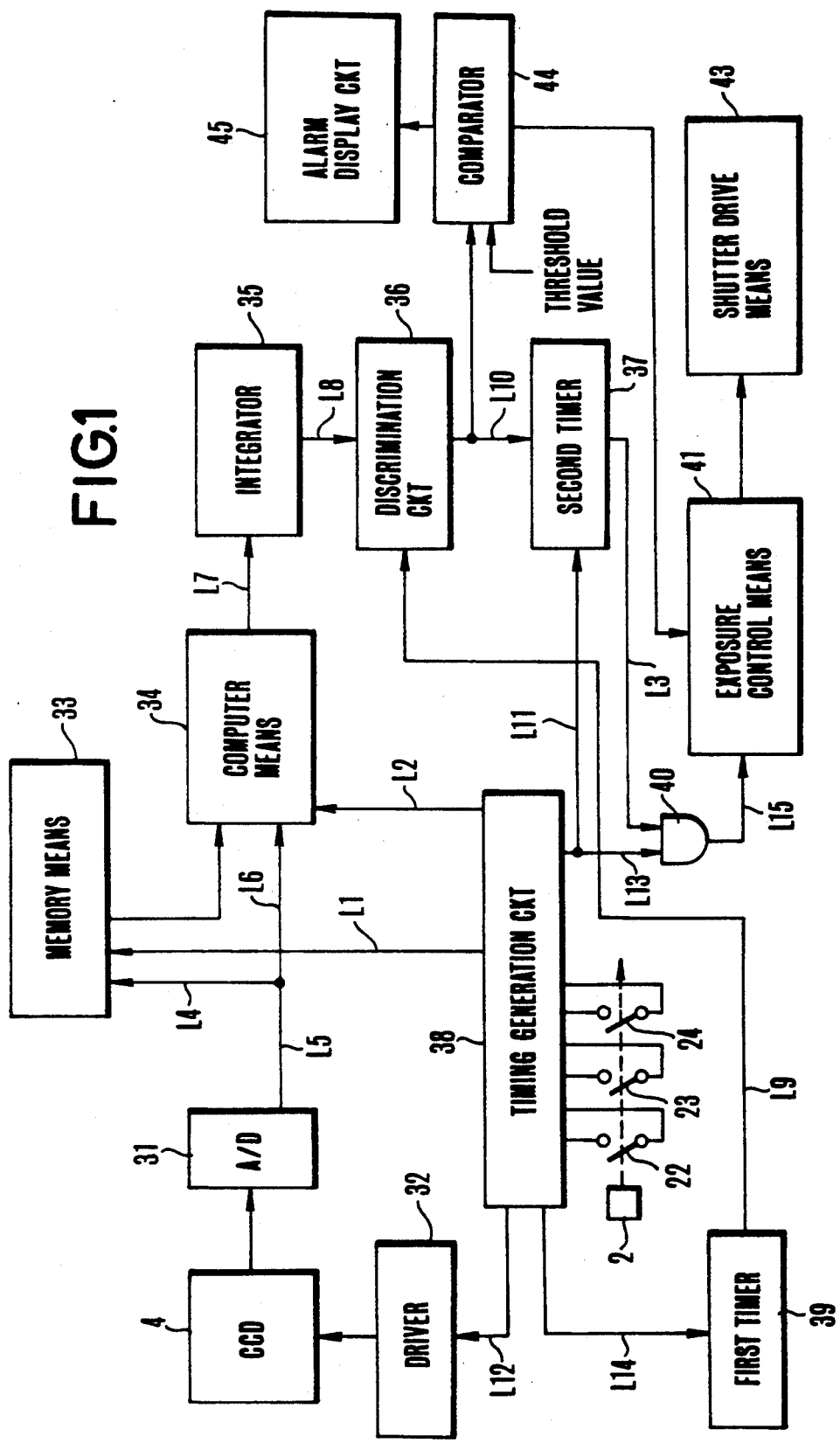
FIG. 1 is a block diagram illustrating an example of a circuit structure in a first embodiment of the invention.

FIG. 1 shows an example of the circuit of this embodiment.

In FIG. 1, the CCD 4 produces analog video outputs time-serially, which are converted to digital values by an A/D converter 31. The video data are also routed to the display means 3 of FIG. 2. The CCD 4 is driven by a driver 32. Memory means 33 for storing the video data is in the form of, for example, a random access memory. Computer means 34 produces an output representing the absolute value of the brightness difference between the video data stored in the memory means 33 and the video data produced from the A/D converter 31.

The differences obtained picture element to element are summed up by an integrator 35 to evaluate the degree of hand shake. Depending on the output of the integrator 35, a discrimination circuit 36 determines a delay time from the "ON" of the switch 24 to the release of the shutter. A timer 37 counts the delay time determined by the discrimination circuit 36 and may be in the form of a counter.

A timing generation circuit 38 makes up operation timings for each constituent unit according to the invention. A first timer 39 counts the time from the "ON" of the switch 23 to the "ON" of the switch 24. An AND gate 40 receives an input from the timing generation circuit 38 and an input from the second timer 37. The output of the AND gate 40 connects to an exposure control means 41.

Exposure control means 41 properly controls the exposure of film. Shutter drive means 43 drives shutter blades (not shown) in response to the exposure control means 41.

The operation of this embodiment in such a structure is described by reference to the timing chart of FIG. 4.

In this embodiment, the time from the "ON" of the switch 23 to the "ON" of the switch 24 is counted by the first timer 39 and on the basis of this counted time and the hand shake amount evaluated by the integrator 35, the shutter time lag, or, in more detail, the delay time from the "ON" of the switch 24 to the actuation of the shutter drive means 43 or the start of opening of the shutter (not shown), is set to a value determined by the discrimination circuit 36, depending on the speed of the hand shake.

Figure 4:
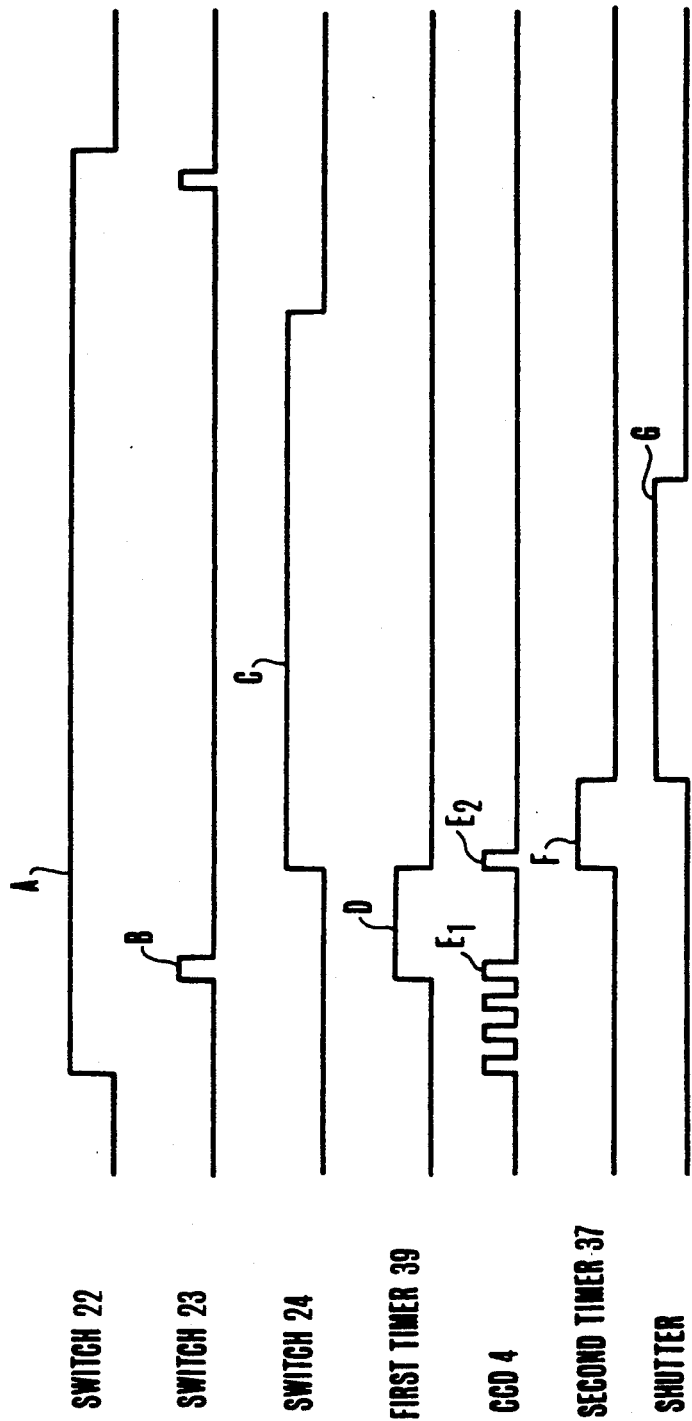
FIG. 4 is a timing chart illustrating an example of operation timings in the circuit of FIG. 1.

In FIG. 4, when the photographer pushes down the release button 2 to the first stroke, the switch 22 is turned on to permit the output of the CCD 4 to be applied to the display means 3, thereby a picked-up image is displayed, until the switch 23 turns on at a time shown by a timing B. Then, as the photographer makes decision to take a shot, when he pushes the second stroke, the switch 23 is turned on in the timing B. At a moment when the switch 23 has turned on, the first timer 39 starts to count a time in a timing D. Also, at the same time as "ON" of the switch 23, the digitized data from the CCD 4 through the A/D converter 31 is permitted to be stored in the memory means 33 in a timing $E_1$. This indication for storage is sent from the timing generation circuit 38 through a signal line L1 to the memory means 33.

Upon further push to the third stroke, the switch 24 turns on in a timing C to stop the first timer 39. Therefore, the time interval from the moment at which the switch 23 has turned on to the moment at which the switch 24 turns on can be evaluated.

In parallel with the above-described operation of the first timer 39, the absolute value of the difference for every picture element between the data of the image picked up at the time of closure of the switch 23' which data has been stored in the memory means 33' and the data of the image picked up at the timing $E_2$ and produced at the output of the A/D converter 31 is obtained from the computer means 34. The absolute values of the differences over all the picture elements are summed up by the integrator 35. The indication for this computation is done through a signal line L2 from the timing generation circuit 38. From the output of the integrator 35 and the output of the first timer which represents the time from the "ON" of the switch 23 to the "ON" of the switch 24, the discrimination circuit 36 works out the shutter time lag. Here, letting the sum of the degrees of hand shake the integrator 35 has added up be denoted by y and the time the first timer 39 has measured by x, the discrimination circuit 36 computes the time lag z which terminates at the start of opening of the shutter by the following formula:

$$z = -Ax + By$$

where A and B are constants determined from the photographic conditions.

As the time from the "ON" of the switch 23 to the "ON" of the switch 24, or the release time lag x shortens, the hand shake is more apt to occur, and, therefore, the shutter time lag z increases. The longer the release time lag x, the shorter the shutter time lag z becomes.

Also, the larger the hand shake amplitude y, the longer the shutter time lag z. This allows the photographer to wait for settlement of his hand shake. The smaller the hand shake amount y, the shorter the shutter time lag z.

When the discrimination circuit 36 has completed the computation of the shutter time lag z in such a manner, the second timer 37 sets the shutter time lag and counts the time of the above-described shutter time lag. When the set timer time (shutter time lag) is reached, the second timer 37 produces an output signal of high level in a timing F shown in FIG. 4 which is applied to the AND gate 40.

Since the timing generation circuit 38 has been producing a "high level" signal as the signal of exposure control start from the time at which the switch 24 turned on to the AND gate 40 through a signal line L13, it is when the second timer 37 produces the "high level" signal to the AND gate 40 through a signal line L3 that a "high level" signal indicating an exposure is sent from the AND gate 40 to the exposure control means 41. Receiving this exposure indication signal, the exposure control means 41 drives the shutter drive means 43 to open the shutter. Thus, the film starts to be exposed.

The time lag for the second timer 37 set in this embodiment may be compared with a threshold value by a comparator 44 as shown in FIG. 1. For this case, it is also possible that when the time lag becomes longer than the threshold value, the shutter is hindered from opening, or an alarm display circuit 45 is actuated to present an alarm display by the detection signal of the comparator 44.

Figure 5:
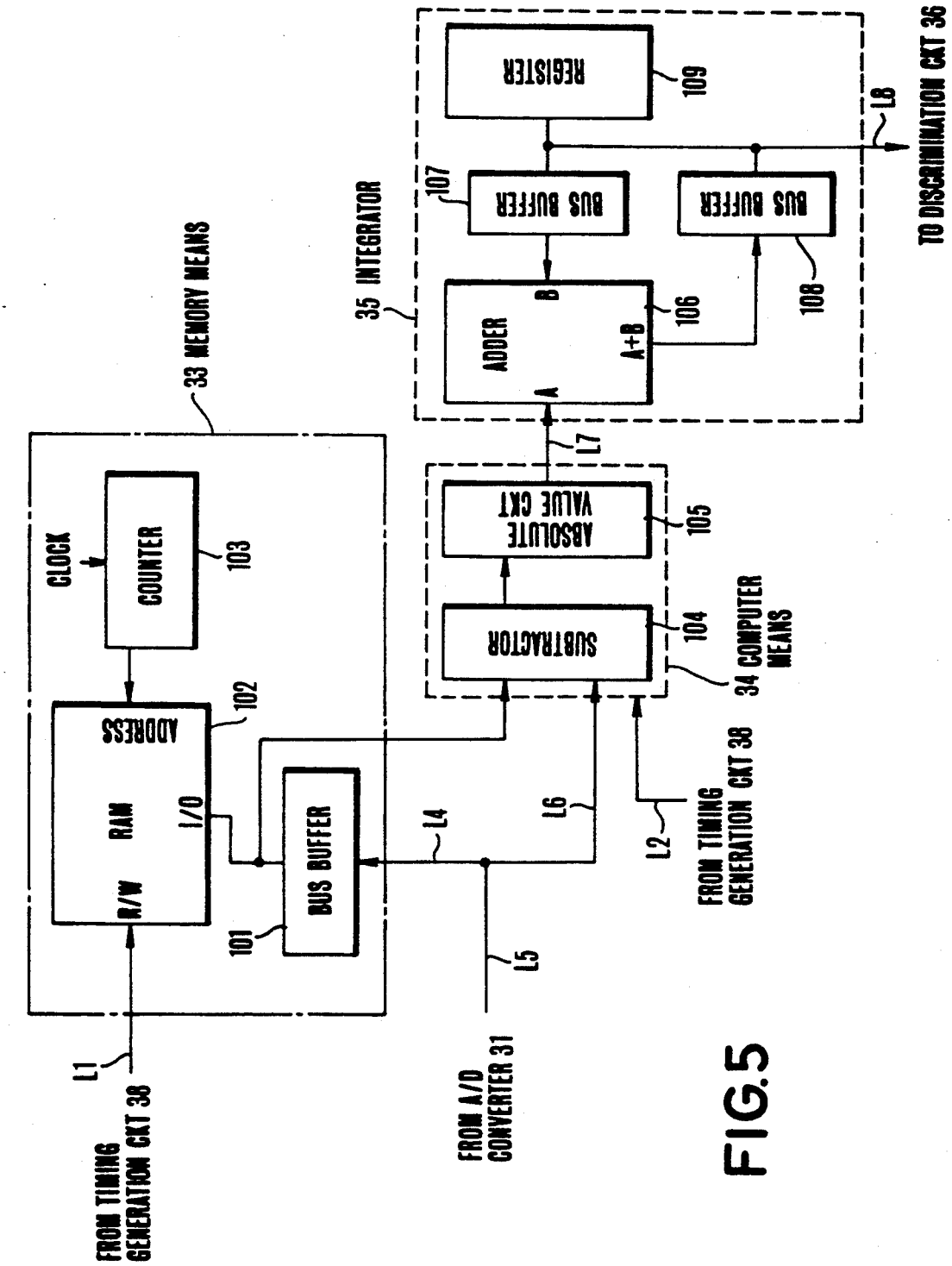
FIG. 5 is a block diagram illustrating the concrete circuit structure of the main parts in the circuit of FIG. 1.

FIG. 5 shows an example of the concrete construction and arrangement of the elements of the main constituent parts in this embodiment.

In FIG. 5, at the time the switch 23 has turned on in response to the stroke of the shutter release button 2, the timing generation circuit 38 sends a command indicating the storage to a RAM 102 in the memory means 33 through the signal line L1, thereby the output for one frame of the A/D converter 31 is applied through a bus buffer 101 and stored in the RAM 102. A counter 103 to which the clock enters establishes the correspondence between the address of the RAM 102 and the output of the A/D converter 31.

Then, when the switch 24 turns on, it is in this timing that the output for one frame of the A/D converter 31 and the data stored in the RAM 102 are subjected to the computation of their difference in each picture element by a subtracter 104. Then, an absolute value circuit 105 computes the absolute value of the above-described difference or brightness difference. The output of the absolute value circuit 105 is applied to an adder 106.

The adder 106 in the integrator 35 adds the brightness difference data of the following picture element to the sum of those of the preceding picture elements contained in a register 109, and causes the summed-up data to be applied through a bus buffer 108 and memorized in the register 109. Therefore, the total sum of the brightness differences over all the area of the picture frame is obtained.

If the photographer vibrates his hand, the object image on the image pickup surface of the CCD 4 changes in position. As a matter of course, a brightness change takes place at the same image pickup point of position. With this phenomenon in notice, the present invention makes use of this total sum of the brightness differences in obtaining the hand shake amount.

The validity of using the total sum of the brightness differences will be easily understood by considering, for example, a situation where the background is dim and the object is bright, or even the reversed situation, for, as the amount of the photographer's hand shake increases, the total sum of the brightness differences increases.

Figure 6:
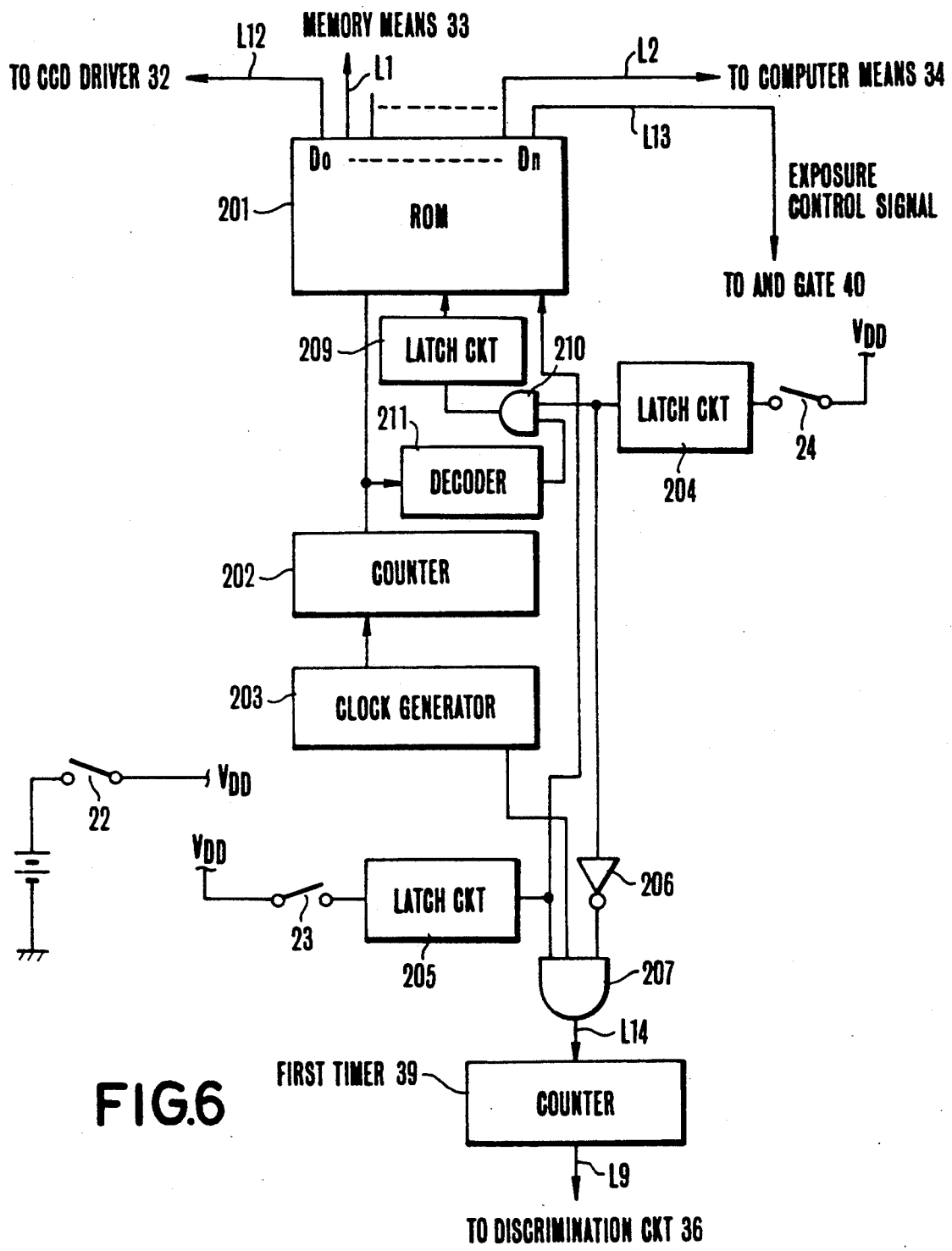
FIG. 6 is a block diagram of illustrating the concrete circuit structure of the timing generation circuit 38 in the circuit of FIG. 1.

FIG. 6 shows an example of the construction and arrangement of the elements of the timing generation circuit 38 in this embodiment.

In FIG. 6, when the switch 22 turns on, the electrical power is supplied to the circuit. The clock of the clock generator 203 is counted up by a counter 202, and this counted value is applied as an address to a ROM 201 for producing timings.

Since the ROM 201 contains timing data for the CCD driver 32, memory means 33, computer means 34 and exposure control means 41 in the respective addresses thereof, each time the address is indicated, the timing data is outputted through the data line L12, L1, L2, L13. When the photographer pushes the shutter release button 2 down to turn on the switch 23, this "ON" signal is latched by a latch circuit 205 comprised of, for example, flip-flops, and a write signal is sent through the signal line L1 to the memory means 33. Therefore, the one-frame data of this timing sent from the CCD 4 can be stored in the memory means 33.

Also, responsive to this latch signal, the first timer 39 starts to count up. A signal which is produced by the further push of the switch 24 is latched by a latch circuit 204. Such a latched "ON" signal is inverted by an inverter 206. When the inverted signal of low level enters an AND gate 207, the first timer 39 stops. Therefore, the time interval from the moment at which the switch 23 has turned on to the moment at which the switch 24 turns on can be measured by the first timer 39.

For note, as the stop signal for the first timer 39, instead of using the output of the latch circuit 204, the output of a latch circuit 209 may be used.

The output of the latch circuit 204 is applied to an AND gate 210. A decoder 211 detects when the counted value of address has reached a certain value. Therefore, when this detection signal from the decoder 211 enters the AND gate 210, the latch circuit 209 sends a "high level" signal as the upper significant address to the ROM 201 at the upper significant address bit.

For this reason, the timing generation circuit 38 can indicate new timings after the switch 24 has turned on. For note, though, in this embodiment, an example of the construction of the timing generation circuit 38 by using the ROM 201 has been shown, a timing generation circuit for each of the constituent units may be constructed with a counter and latch circuits in cooperation with the common clock generator 203 so that the prescribed timing signals are sent to the above-described individual constituent units.

Figure 7:
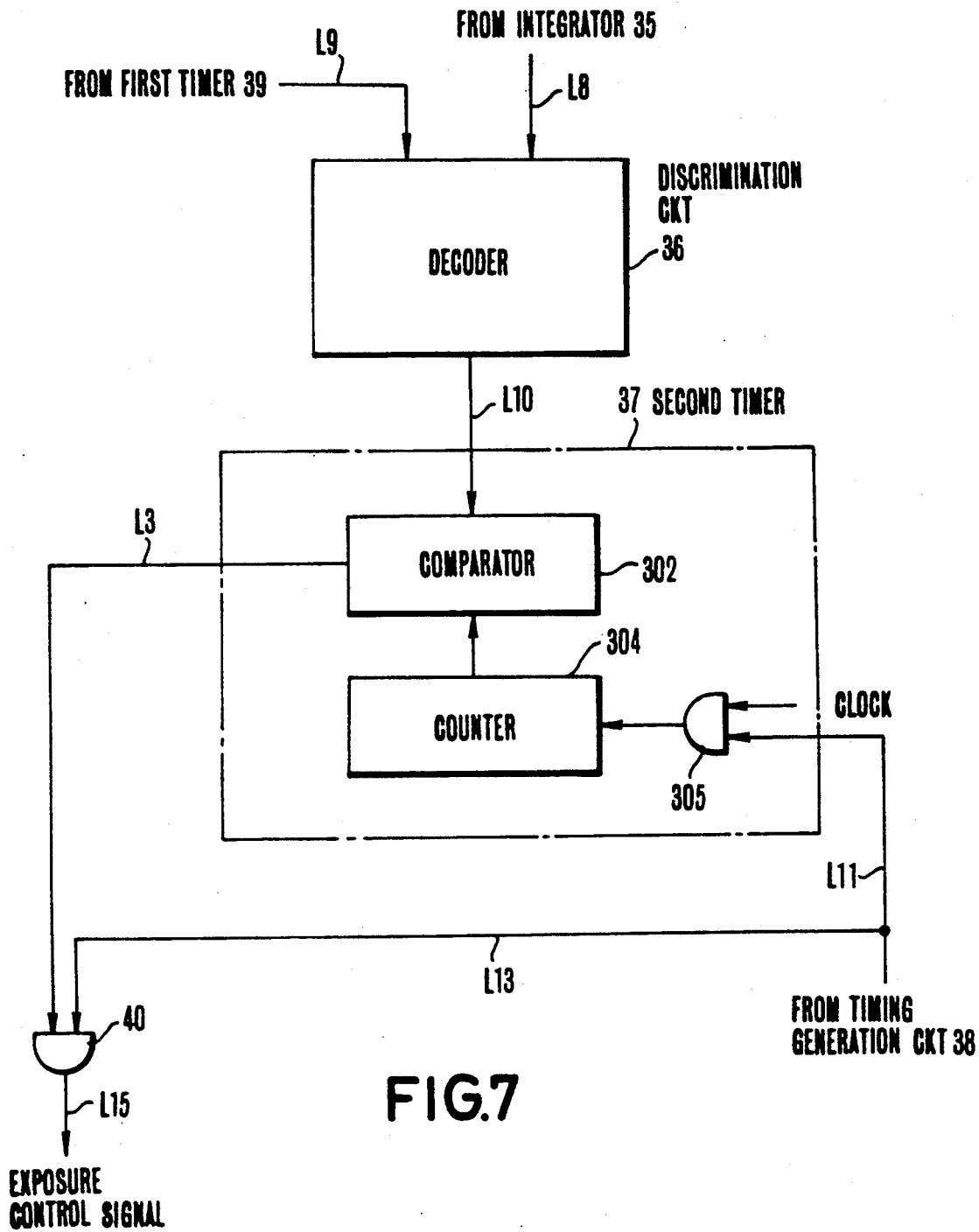
FIG. 7 is a block diagram of illustrating the concrete structure of the discrimination circuit 36 and the second timer 37 in the circuit of FIG. 1.

FIG. 7 shows an example of the concrete construction and arrangement of the elements of the discrimination circuit 36 and the second timer 37 in this embodiment.

In FIG. 7, 36 is a discrimination circuit utilizing a decoder. The output of the first timer 39, which memorizes the time from the "ON" of the switch 23 to the "ON" of the switch 24, and the output of the integrator 35 which represents the value of the image blur (hand shake amount), are applied to the decoder 36. The decoder 36 produces an output representing the interval time from the "ON" of the switch 24 to the start of the exposure, which is applied to a comparator 302.

That is, when the measured time by the first timer 39 is long, as it implies that the release button 2 has slowly been pushed down, the shutter time lag is caused to be short. For the large output of the integrator 35, as it implies that the image blur is large, the shutter time lag is made long. Such a correlation is given to the output scheme of the decoder 36, for the interval time is determined.

The second timer 37 includes a counter 304. When the exposure start signal from the timing generation circuit 38 is applied through a signal line L11 to an AND gate 305 at the gating control input, the counter 304 starts to count up a clock signal. When the outputs of the decoder 36 and the counter 304 have coincided with each other, the comparator 302 produces an output signal of high level which is applied to an AND gate 40, thus terminating the duration of the shutter time lag, that is, initiating an exposure.

For note, though, in this embodiment, the decoder has been used in the discrimination circuit 36, the discrimination circuit 36 may otherwise be constructed by using a subtracter, an adder and a multiplier, or a ROM to perform computation based on the above-defined formula: $z = -Ax + By$, wherein A and B are the constants, x is the output value of the first timer 39, and y is the output value of the integrator 35.

Figure 8:
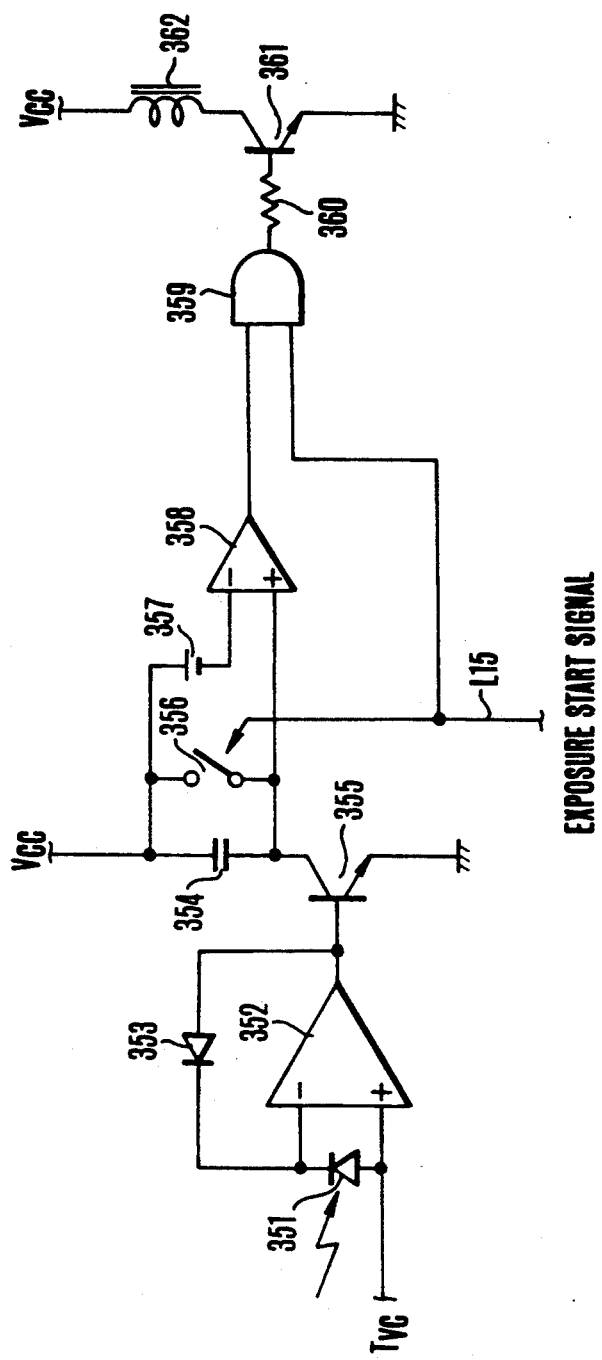
FIG. 8 is an electrical circuit diagram illustrating the concrete structure of the exposure control means 41 in the circuit of FIG. 1.

FIG. 8 shows the circuit structure of the exposure control means 41 in this embodiment.

In FIG. 8, 351 is a photosensitive element for light measurement or SPC. By an operational amplifier 352 and a diode 353 for logarithmic compression, the photocurrent generated in the SPC 351 is converted to a logarithmically compressed voltage. Letting the photocurrent be denoted by $I_{spc}$, the voltage produced at the output of the operational amplifier 352 is given by the expression:

$$TVc + (kT/q)\ln(I_{spc}/i_0) \tag{1}$$

where TVc is the reference voltage source, k is the Boltzmann's constant, T is the absolute temperature, q is the charge of an electron, and $i_0$ is the backward saturation current of the diode 353.

The output voltage of the operational amplifier 352 enters the base of a transistor 355 for expansion. For the collector current Ic, the following equation is established:

$$(kT/q)\ln(Ic/i_0) = TVc + (kT/q)\ln(I_{spc}/i_0) \tag{2}$$

If the TVc is taken at a value of voltage proportional to kT/q, or $TVc = (kT/q)\ln TVc'$, the equation (2) can be rewritten as follows:

$$(kT/q)\ln(Ic/i_0) = (kT/q)\ln(I_{spc} \times TVc'/i_0) \tag{3}$$

Hence, $$Ic = TVc' \times I_{spc} \tag{4}$$

In such a manner, a current equal to TVc' times the photo-current flows to the collector of the transistor 355.

When the exposure is started, the switch 356 turns off to permit a timing capacitor 354 to be charged with the collector current of the transistor 355. For note, Vcc denotes the electrical power source of the circuit.

This voltage is compared with the reference voltage 357 by a comparator 358. When it exceeds the reference voltage 357, the output of the comparator 358 changes from high to low level. An AND gate 359 produces an output of high level from the time of the exposure is started until the output of the comparator 358 becomes a low level, for controlling a transistor 361 through a resistor 360 to energize a coil 362. By this coil 362, the shutter (not shown) is controlled to obtain a proper exposure.

Figure 9:
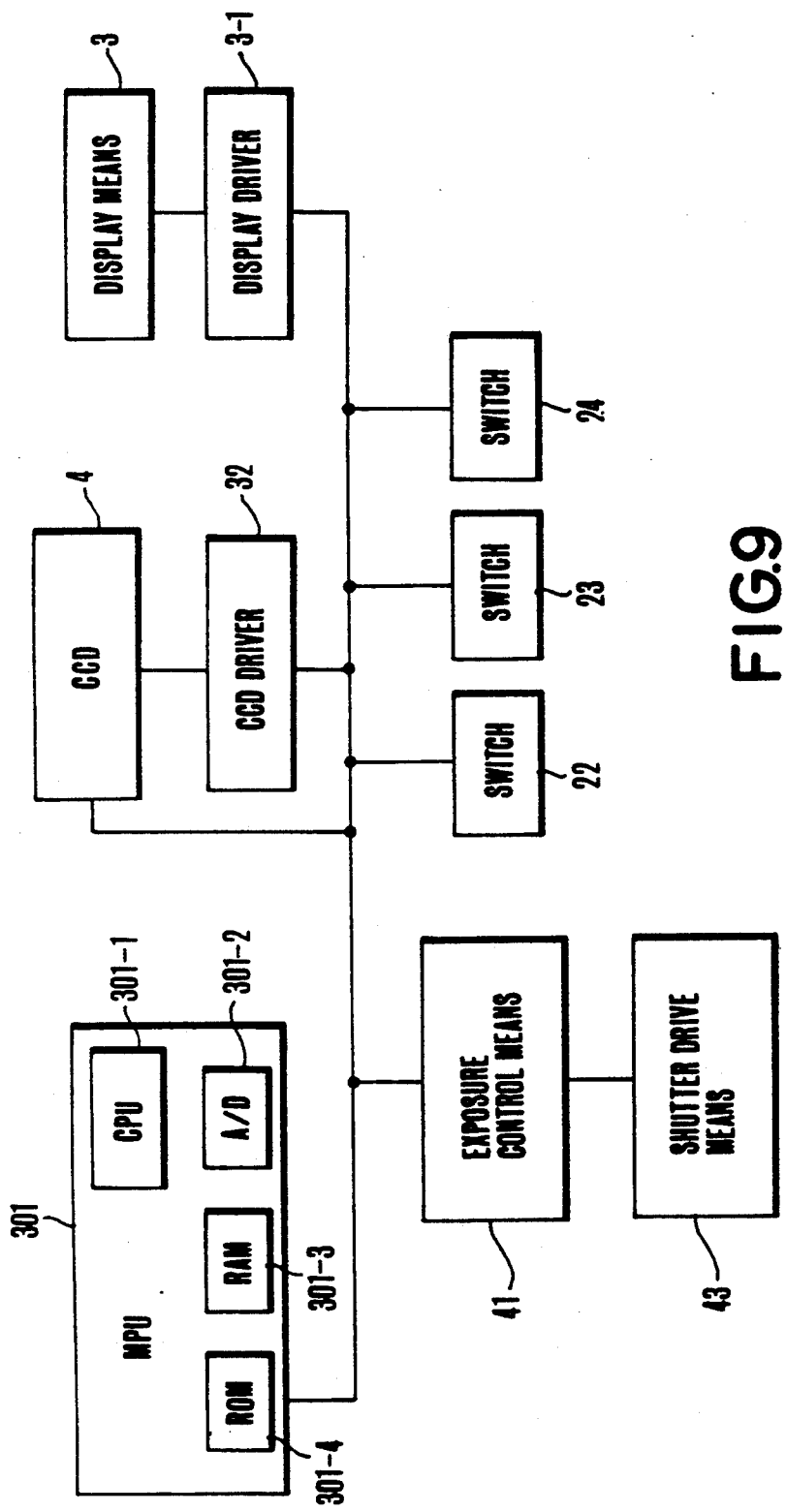
FIG. 9 is a block diagram illustrating another example of the circuit structure in the first embodiment of the invention.

FIG. 9 shows another example of the arrangement in this embodiment.

This arrangement exemplifies the use of a microcomputer (MPU) in performing the functions of the A/D converter 31, memory means 33, computer means 34, integrator 35, discrimination circuit 36 and first and second timers 39 and 37 in the foregoing arrangement. For note, in FIG. 9, the similar parts to those of FIG. 1 are denoted by the same reference numerals.

The MPU 301 includes a computing unit (CPU) 301-1, an A/D converter 301-2, a RAM 301-3 and a ROM 301-4. The CPU 301-1 carries out the control program of FIGS. 10A and 10B contained in the ROM 301-4. The A/D converter 301-2 converts image data picked up by the CCD 4 to a digital form.

Figure 10A:
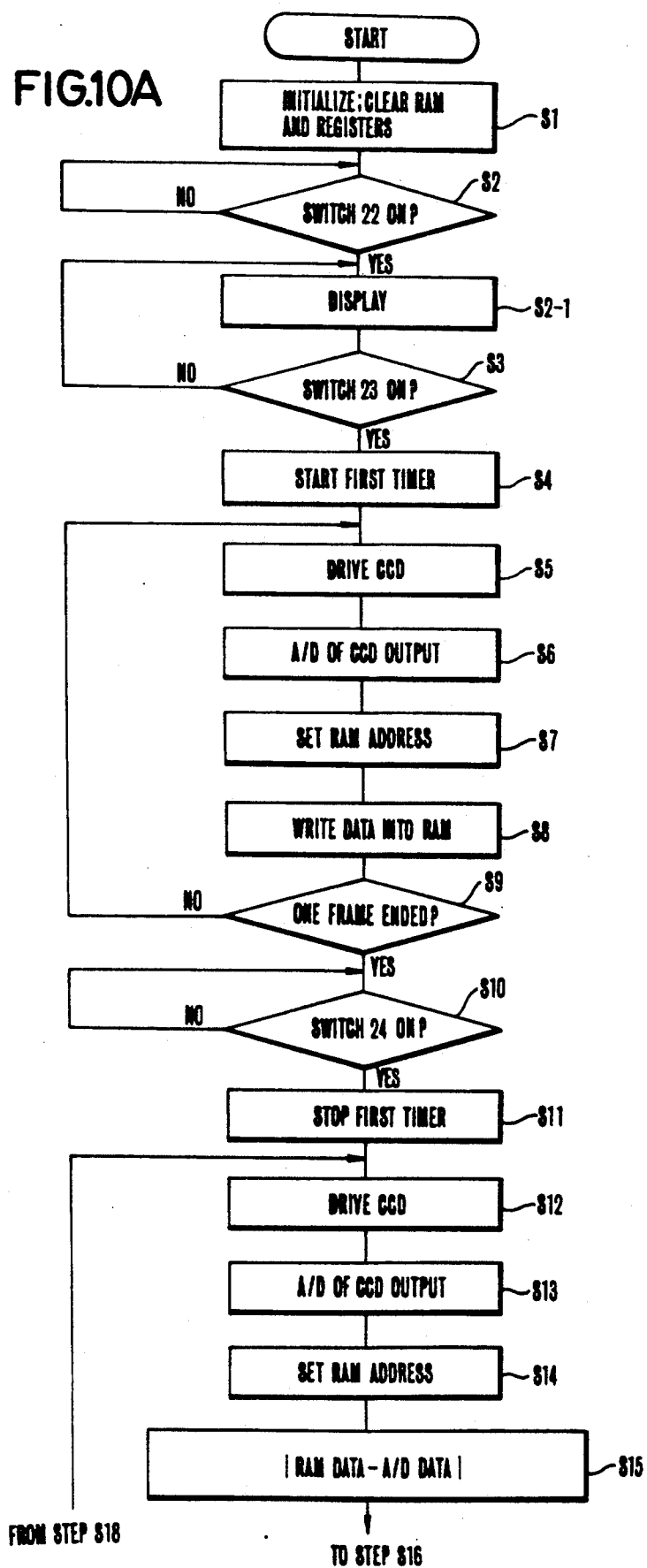
FIGS. 10A and 10B are a flowchart illustrating an example of the program for the control of the MPU 301 in the circuit of FIG. 9.
Figure 10B:
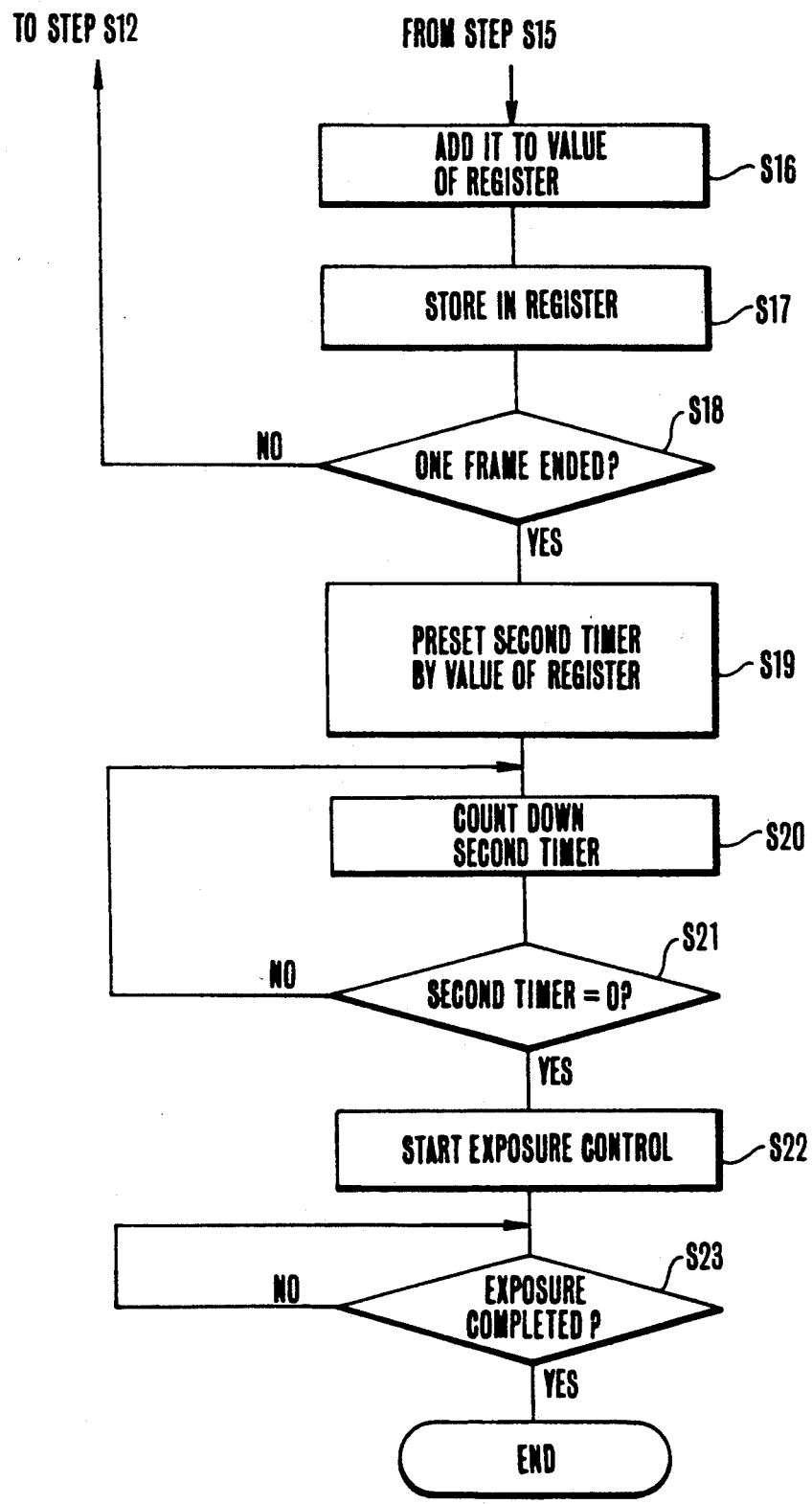

The RAM 301-3 is memory means for storing the above-described image data, contains the variables to be used in the control program shown in FIGS. 10A, 10B, and plays the role of a counter.

FIGS. 10A, 10B show an example of the program for the control of the MPU 301 in this arrangement.

In FIGS. 9 and 10A, 10B, when the electrical power source in the camera body is thrown, the RAM 301-3 and registers H to K in the CPU 301-1 are cleared, and the other constituent instruments are initialized (step S1).

Then, wait for depression of the release button 2. When the switch 22 turns ON, the CCD 4 is driven. The picked-up image data the CCD 4 has brought in, after having been converted to the digital form by the A/D converter 301-2, are displayed on the display means 3 through the display driver 3-1. Subsequently, the picked-up image continues being displayed until the switch 23 turns on (steps S2-S3).

When the switch 23 turns on, an initial value is introduced into register H in the CPU 301-1 which corresponds to the first timer 39 of the foregoing arrangement, and counting of the reference clock is started (step S4). In the next step S5, the MPU 301 gives the CCD driver 32 a renewed command of driving the CCD 4. The data for one frame produced from the CCD 4 after having been A/D converted are then permitted to be stored in the RAM 301-3, and the MPU 301 counts the passing time by the register H (steps S6-S9).

When the MPU 301 detects the "ON" of the switch 24 (step S10), the first timer 39 or the register H is then stopped from counting the reference clock (step S11). Then, the MPU commands the CCD driver 32 to drive the CCD 4. The image data for one frame obtained from the CCD 4 after having been converted to a digital signal is brought in the register I in the interior of the CPU 301-1 (steps S12-S13).

In the next step S14, the CPU 301-1 reads out the image data stored in the RAM 301-3, and computes the absolute value of the difference between the readout data of one of the picture elements and the stored image data of the corresponding picture element in the register I (steps S12-S13).

In a step S16, the absolute value of the difference between the image data of the above-described picture element is added to the previous sum of absolute values in the register J. Such a procedure of the steps S12-S18 is repeated over for all the picture elements of one frame to obtain the total sum y of the differences of the image data.

When the computation of the total sum y of the differences for the picked-up image of one frame is complete, the value of time x stored in the register H and the value of the total sum y of the differences contained in the register J are computed based on the formula: $z = -Ax + By$. The computed value z is taken as the counted time by the second timer 37 and stored in the register K (step S19).

Then, for each pulse of the reference clock, one unit time is subtracted from the content of the register K. When the content of the register K becomes 0, the MPU 301 sends the exposure start signal to the exposure control means 41, thus initiating an exposure operation of the film by the exposure drive means 43 (step S20-S22). Then, when the MPU 301 receives the exposure completion signal from the exposure control means 41 (step S23), this control program ends. Subsequently, each time the camera is shot, the execution of this control program is recycled. Though, in this embodiment, the actual image has been recorded on the photographic film, the invention is not confined thereto. It is obvious that the invention can be practiced even in the camera using the rewrite-enable recording medium, for example, magnetic disc.

As has been described above, according to the present invention, by taking into account the stroke-by-stroke actuation of shutter release as the most probable cause for hand shake, the amount of the vibration of the camera which is ascribable to the actuation of shutter release is detected by the CCD sensor to automatically set the shutter time lag. Therefore, regardless of the experience of the photographer in shooting the camera, the influence of his hand shake is prevented and he can take photographs of good quality. Also, when the hand shake is extremely large, the exposure operation is hindered. Because, in this case, an alarm of the hand shake is produced, the photographer may give up the shooting, with an advantage of saving that area of film which would otherwise be wastefully used up.

Next, a second embodiment of the invention is described.

The outer appearance in this embodiment is similar to that shown in FIG. 2. So, its explanation is omitted.

Figure 11:
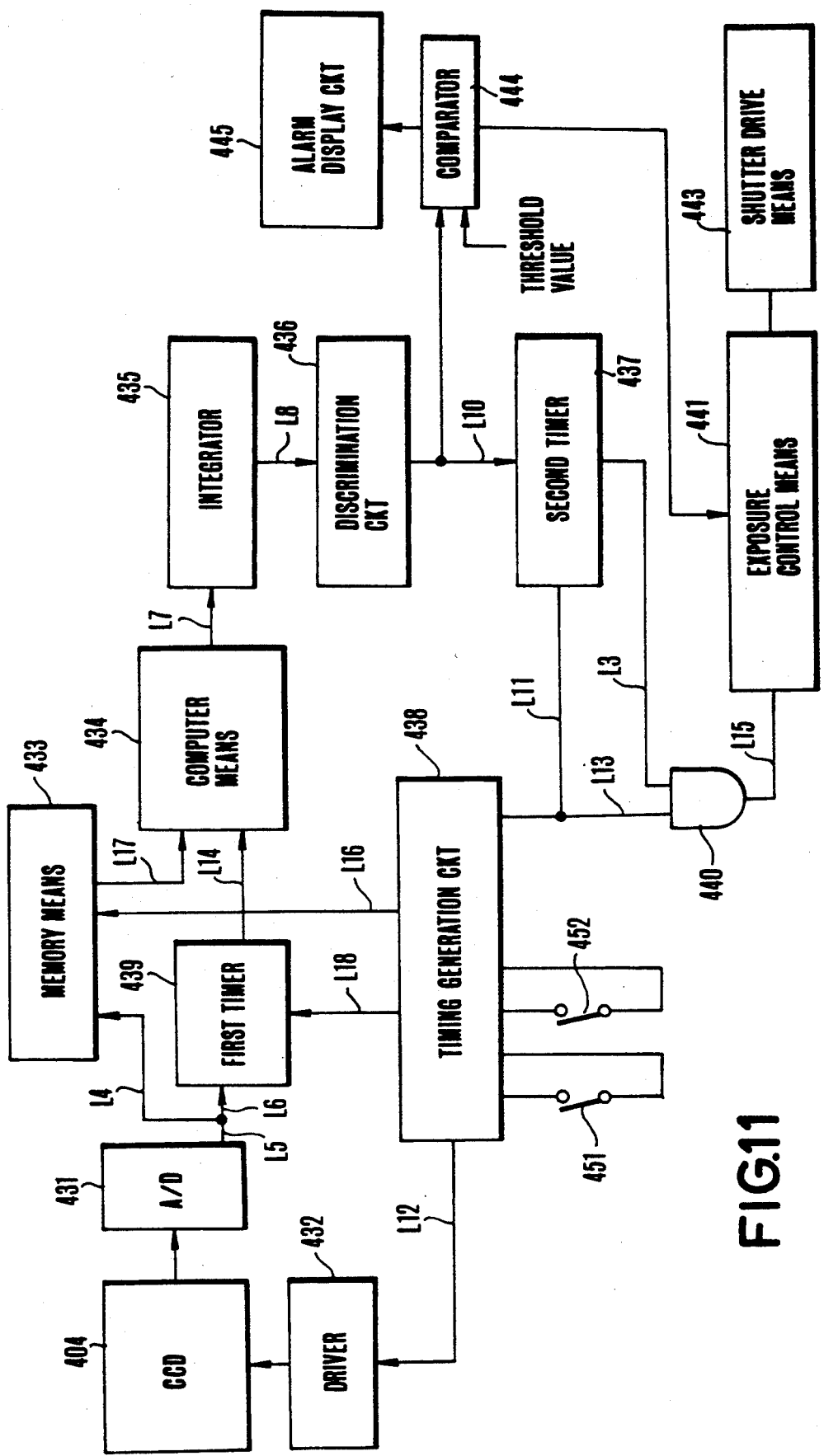
FIG. 11 is a block diagram illustrating an example of the circuit structure in the second embodiment of the invention.

FIG. 11 shows an example of the circuit structure in this embodiment.

In FIG. 11, a CCD 404 produces analog video signals time-serially which are then converted to digital values by an A/D converter 431. The video data are given also to the display means 3 of FIG. 2. A CCD driver 432 drives the CCD 404. The video data are stored in memory means 433, for example, a random access memory. The video data stored in the memory means 433 and the video data which are produced from the CCD 404 through the A/d converter 431 and a first timer 439 are computed by computer means 434 to obtain the absolute value of the brightness difference between the video data of each picture element.

An integrator 435 sums up the above-described differences of all the picture elements to obtain the amount of the hand shake. Depending on the integrated amount of hand shake, a discrimination circuit 436 determines a delay time from the "ON" of a switch 452 to the release of the shutter. The switch 452 turns on when the release button 2 is pushed to the second stroke. The delay time is counted by a second timer 437. As this timer, use may be made of a counter.

A timing generation circuit 438 makes up timings in which all the constituent units according to the invention operate. A first timer 439 counts a prescribed time from the "ON" of a switch 451. The switch 451 turns on when the release button 2 is pushed to the first stroke. An gate 440 receives inputs from the timing generating circuit 438 and the second timer 437. The output of the AND gate 440 connects to the exposure control means 441.

Exposure control means 441 properly controls the exposure of the film. Responsive to the exposure control means 441, shutter drive means 443 drives shutter blades (not shown).

The operation of the circuit of such construction is described by reference to the timing chart of FIG. 12.

In this embodiment the discrepancy of the images picked up by the CCD 404 at two points in time, of which the first is when a switch 452 has been pushed down to indicate a shot and the second is spaced from the first by a prescribed time, is evaluated as the amount of hand shake by the integrator 435, and the shutter time lag, or, in more detail, the delay time from the "ON" of the switch 452 to the start of opening of the shutter (not shown), is set to a value depending on the amount of hand shake determined by the discrimination circuit 436.

Figure 12:
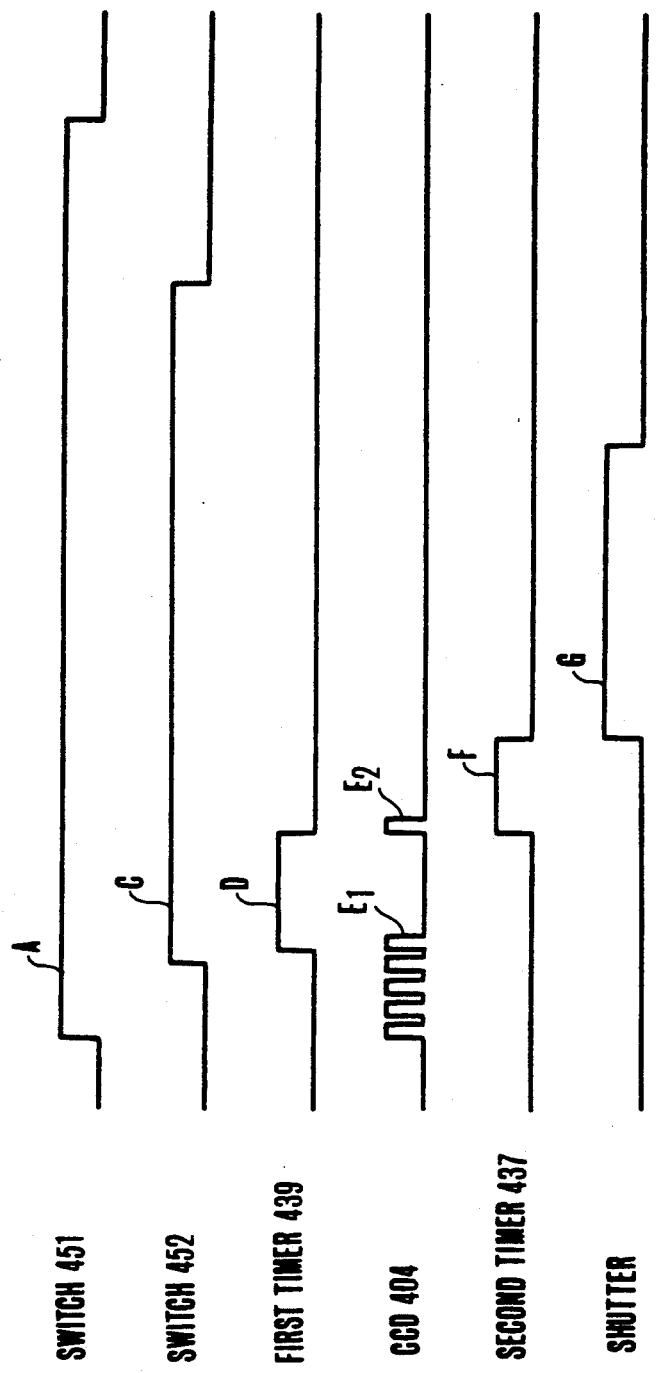
FIG. 12 is a timing chart illustrating an example of operation timings in the circuit of FIG. 11.

In FIGS. 11 and 12, when the photographer pushes down the release button 2 shown in FIG. 2 to the first stroke, a switch 451 is turned ON to permit the output of the CCD 404 to be sent to, the display means 3 of FIG. 2 until a switch 452 turns ON as shown by a timing C. The picked up image is displayed on the display means 3. Then, as the photographer decides to take a shot, when he pushes down the shutter button 2 to the second stroke, the switch 452 soon turns ON in the timing C. At a moment when the switch 452 has turned ON, the first timer 439 starts to count time in a timing D. Also, at the same time when the switch 452 turns ON, the image data produced from the CCD 404 and converted through the A/D converter 431 to the digital form are stored in the memory means 433 at a timing $E_1$. This indication for storage is sent from the timing generation circuit 438 through a signal line L16 to the memory means 433.

When the first timer 439 has completed the counting of the prescribed time, the first timer 439 stops.

At the same time the first timer 439 is stopped, the image data obtained from the CCD 404 through the A/D converter 431 and the image data stored in the memory means 433 are computed by the computer means 434 to obtain the absolute value of their difference for each picture element. The absolute values of all the picture elements of one frame are summed up by an integrator 435. From the total sum of the differences produced from the integrator 435, the discrimination circuit 436 computes the shutter time lag. Here, letting the sum of the hand shake amount computed by the integrator 435 be denoted by y, the discrimination circuit 436 computes the shutter time lag z based on the formula: $z = By$ where B is a constant determined from the photographic conditions.

Therefore, the larger the hand shake amount y, the longer the shutter time lag z becomes. This allows the camera to wait for settlement of the hand shake. The smaller the hand shake amount y, the shorter the shutter time lag z.

In such a manner, the shutter time lag z is calculated by the discrimination circuit 436. Then, the second timer 437 sets this shutter time lag. As the second timer 437 counts the thus-obtained value of the shutter time lag z, when the set timer time (shutter time lag) has elapsed, the second timer 437 turns off in a timing F shown in FIG. 12, producing an output signal of high level which is applied to the AND gate 440.

Since, from the time switch 452 has been ON, the timing generation circuit 438 has produced a signal of high level as the exposure control start signal which has been applied through a signal line L13 to the AND gate 440, it is when the second timer 437 produces an output signal of high level which is applied through a signal line L3 to the AND gate 440 that the AND gate 440 sends a signal of high level indicating an exposure to the exposure control means 441. When the exposure control means 441 receives this exposure indicating signal, it actuates the shutter drive means 443, thus opening the shutter to start an exposure of the film.

In this embodiment it is also possible that the set value of the time lag of the second timer 437 is compared with a threshold value by a comparator 444 shown in FIG. 11, and, when it exceeds the threshold value, this detection signal of the comparator 444 is used for hindering the shutter from opening, or for actuating an alarm display circuit 445 to present an alarm display.

Figure 13:
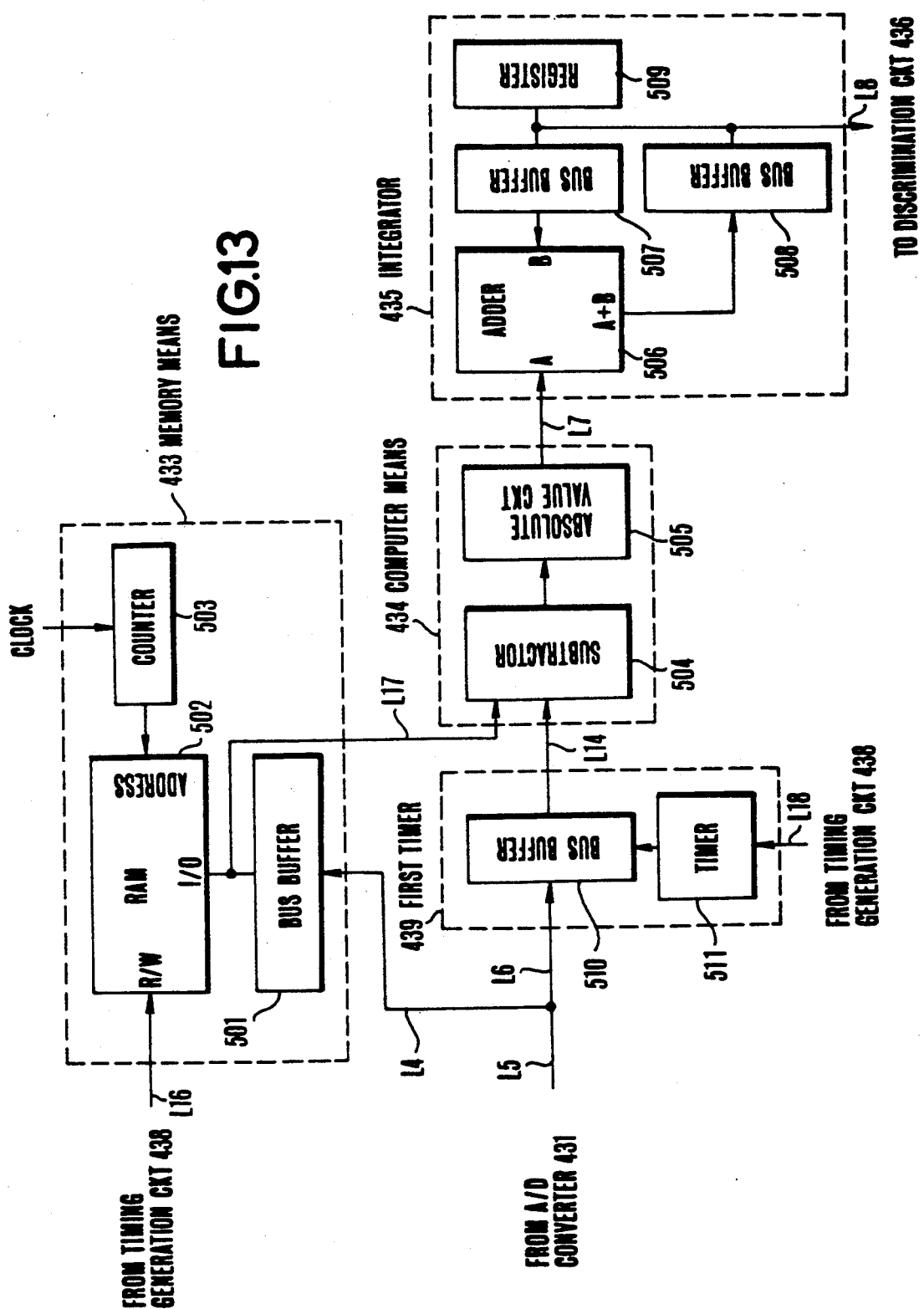
FIG. 13 is a block diagram of illustrating the concrete circuit structure of the main parts in the circuit of FIG. 11.

FIG. 13 shows an example of the concrete construction and arrangement of the elements of the main constituent parts in this embodiment of the invention.

In FIG. 13, when a storage indicating command is sent in the timing of the "ON" of the switch 452 of FIG. 11 from the timing generation circuit 438 to a RAM 502 in the interior of the memory means 433 through a signal line L16, the output for one frame of the A/D converter 431 is applied through a bus buffer 501 to, and stored in, the RAM 502. Also, within the first timer 439, a timer 511 starts to count a prescribed time. A counter 503 receptive of the clock relates the address of the RAM 502 to the output from the A/D converter 431.

Then, when the timer 511 has counted the prescribed time, the image output for one frame produced from a bus buffer 510 in the interior of the first timer 439 and the data stored in the RAM 502 are computed by a subtracter 504 to obtain their difference for every one picture element. Then, an absolute value circuit 505 calculates the absolute values of the above-described differences or brightness differences. The absolute value circuit 505 output is applied to an adder 506.

The adder 506 in the interior of the integrator 435 adds the calculated brightness difference data of each picture element to the summed data contained a register 509, while corresponding in the picked-up image position to each other. The total sum of the data is outputted through a bus buffer 508 to the discrimination circuit 436 and stored in the register 509. Therefore, the total sum of the brightness differences over all the picture elements of one frame is obtained.

If the photographer does hand shake, the object image on the CCD 404 changes its position relative to the picture frame. As a matter of course, a brightness change is seen at the same point in position of the picked-up image. With this point in notice, the present invention is to obtain the hand shake amount by seeking this total sum of the brightness differences.

For example, in the case when the background is dim and the object is bright, or even in the reversed case, as the photographer's hand shake amount increases, this total sum of the brightness differences increases, as can be easily understood.

Figure 14:
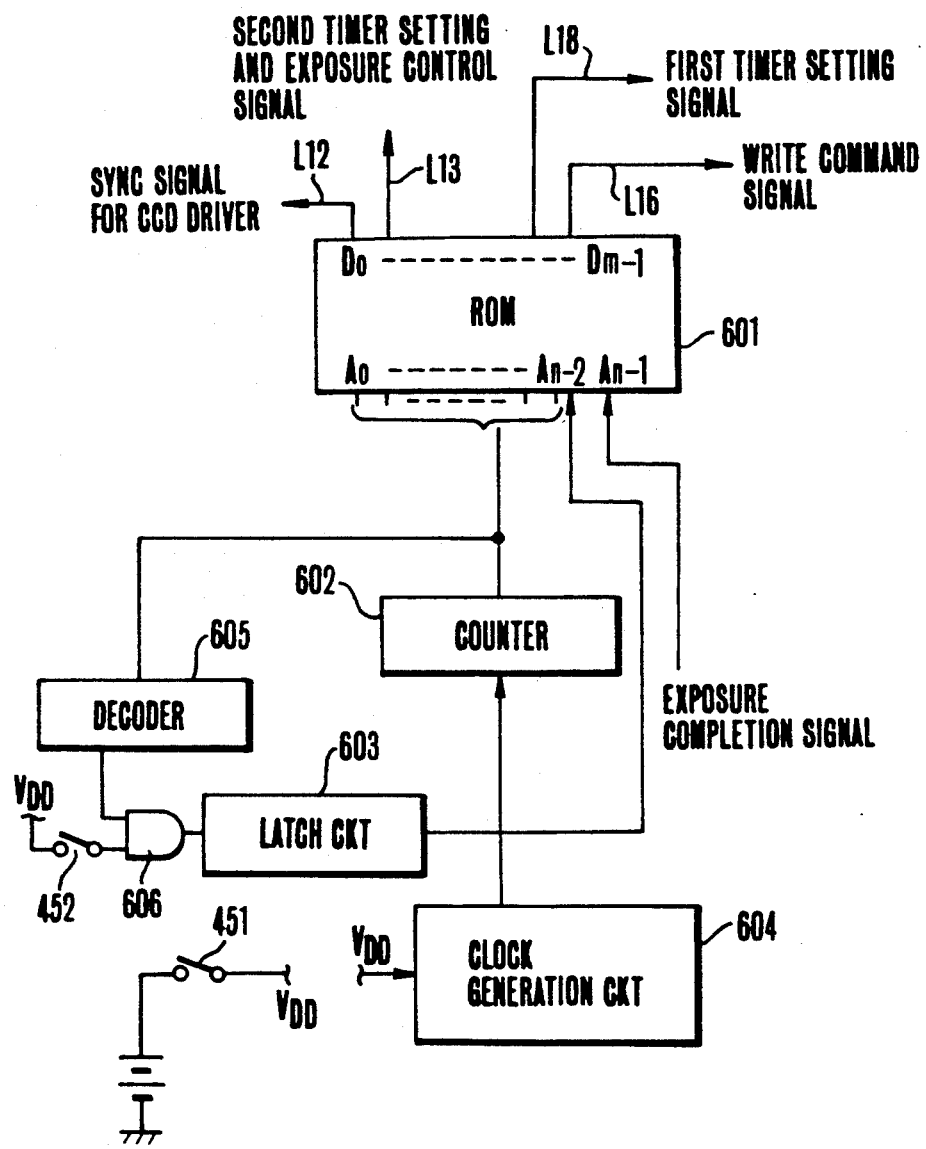
FIG. 14 is a block diagram of illustrating the concrete circuit structure of the timing generation circuit 438 in the circuit of FIG. 11.

FIG. 14 shows an example of the concrete construction and arrangement of the elements of the timing generation circuit 438 in this embodiment.

In FIG. 14, when a switch 451 turns on, electrical power is supplied to the circuit. The clock of a clock generating circuit 604 is counted up by a counter 602. This counted value is applied as an address to a ROM 601 for producing timings.

From the ROM 601, each time the address is indicated, the timing data for the CCD driver 432, memory means 433 and exposure control means 441 contained in the address are outputted through data lines L12, L6, L13 of the ROM 601.

When the photographer pushes down the shutter release button 2 of FIG. 2 to turn on a switch 452, this "ON" signal is latched by a latch circuit 603 comprised of, for example, flip-flops, and a write signal is sent through the signal line L16 to the memory means 433. Therefore, the data for one frame sent from the CCD 404 can be stored in the memory means 433.

In this embodiment, while the use of the ROM 601 has been exemplified in constructing the timing generation circuit 438, a timing generation circuit for each of the components may otherwise be constructed with a counter, a latch circuit and others and arranged to count the clock from the common reference clock generating circuit 604 to produce a timing signal which is applied to the respective one of the components.

Figure 15:
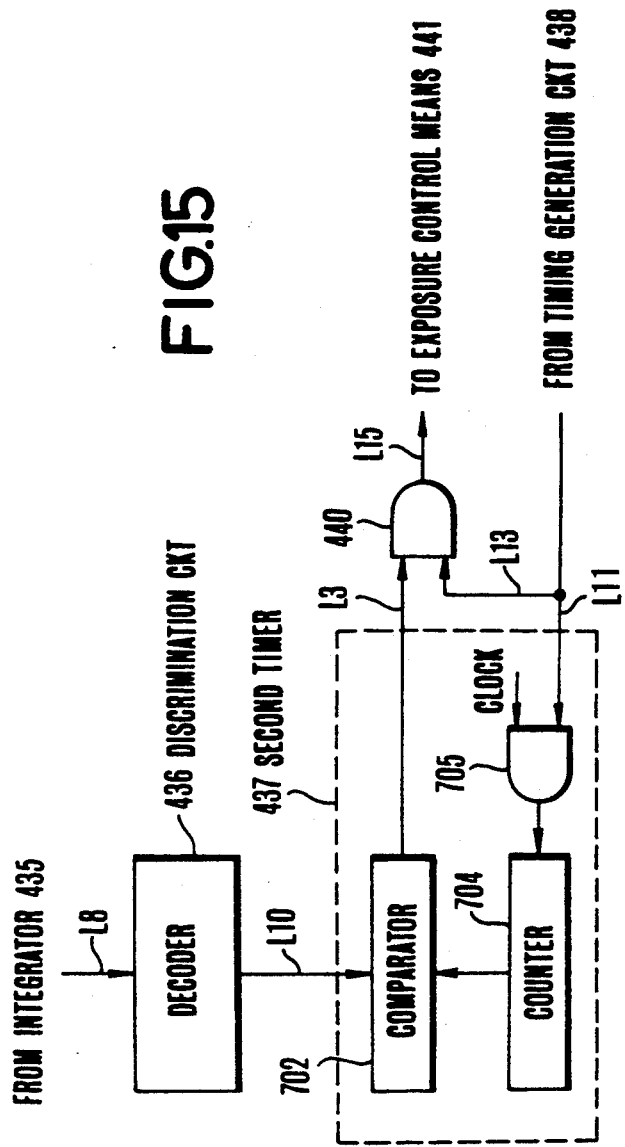
FIG. 15 is a block diagram of illustrating the concrete construction of the discrimination circuit 436 and the second timer 437 in the circuit of FIG. 11.

FIG. 15 shows an example of the concrete construction and arrangement of the elements of the discrimination circuit 436 and second timer 437 in this embodiment.

In FIG. 15, 436 is the discrimination circuit utilizing a decoder. The output of an integrator 435 whose value corresponds to the image blur (hand shake amount) is applied to the decoder 436. The interval time from the "ON" of the switch 452 to the start of an exposure is output to a comparator 702. Here, when the output of the integrator 435 is large, the image blur is large. Therefore, the shutter time lag must be increased. Such a correlation is schemed out in producing the output of the decoder 436 for determining the interval time.

The second timer 437 includes a counter 704 receptive of the signal of exposure start from the timing generation circuit 438 through a signal line L11 and an AND gate 705 for counting up in synchronism with the clock signal which is at the same time applied to an AND gate 705. When the outputs of the decoder 436 and the counter 704 coincide with each other, a comparator 702 produces a signal of high level which is applied to the AND gate 440, indicating the termination of duration of the shutter time lag, or the initiation of an exposure.

In this embodiment, while the decoder has been used in the discrimination circuit 436, a subtracter, adder, multiplier and others, or a ROM may be used in constructing the discrimination circuit 436 to perform computation based on the above-described equation: $z = By$ wherein B is a constant, and y is the output value of the integrator 435.

The concrete structure of the exposure control means of FIG. 11 is similar to that of FIG. 8, and therefore, its explanation is omitted.

Figure 16:
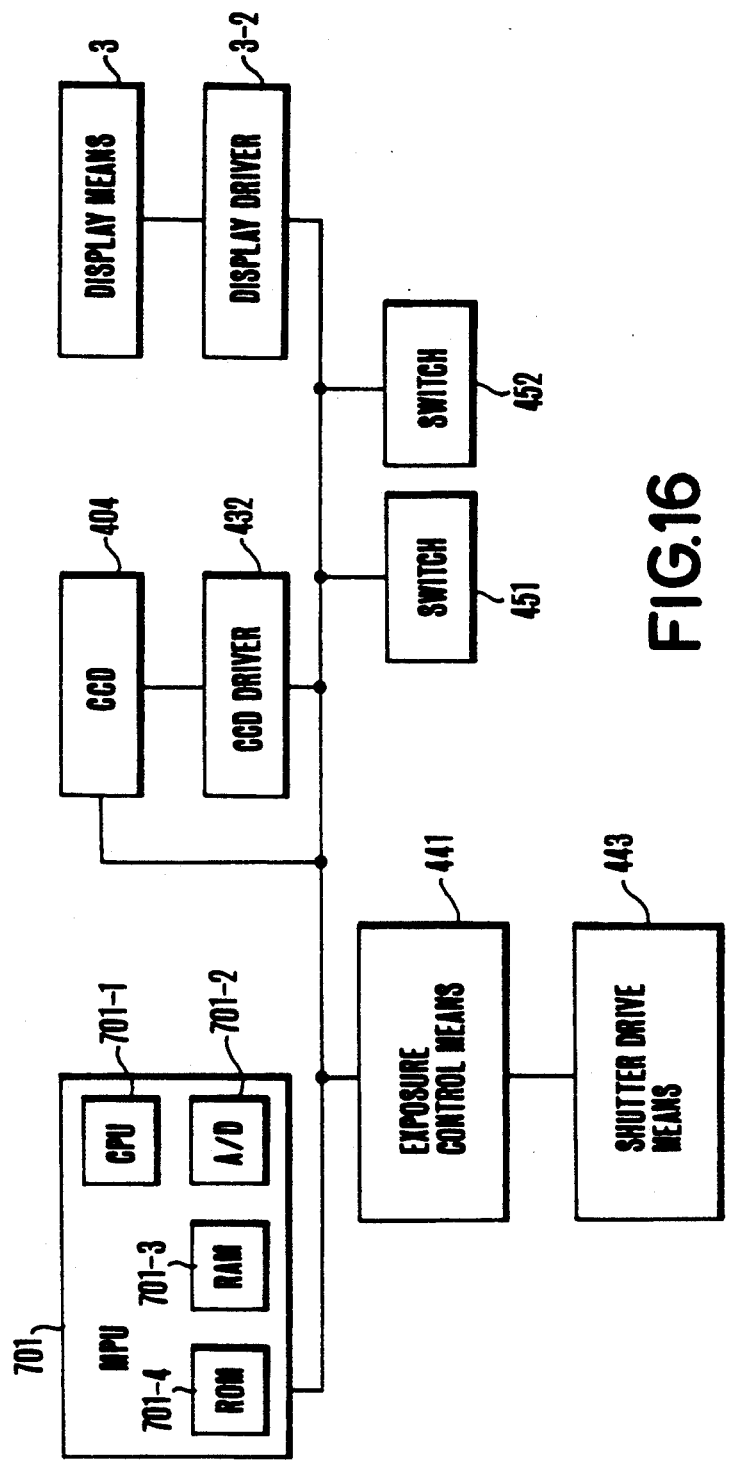
FIG. 16 is a block diagram illustrating another example of the circuit structure in the second embodiment of the invention.

FIG. 16 shows another example of the arrangement in the second embodiment.

This arrangement exemplifies the use of a microcomputer (MPU) in performing the equivalent functions to those of the A/D converter 431, memory means 433, computer means 434, integrator 435, discrimination circuit 436 and first and second timers 439 and 437 in the arrangement of FIG. 11. For note, in FIG. 17, the similar parts to those of FIG. 11 are denoted by the same reference characters.

701 is the MPU including a computing unit (CPU) 701-1, an A/D converter 701-2, a RAM 701-3 and a ROM 701-4. The CPU 701-1 executes a control program of FIGS. 17A and 17B contained in the ROM 701-4. The A/D converter 701-2 converts the data of the picked-up image by the CCD 404 from the analog to the digital form.

Figure 17A:
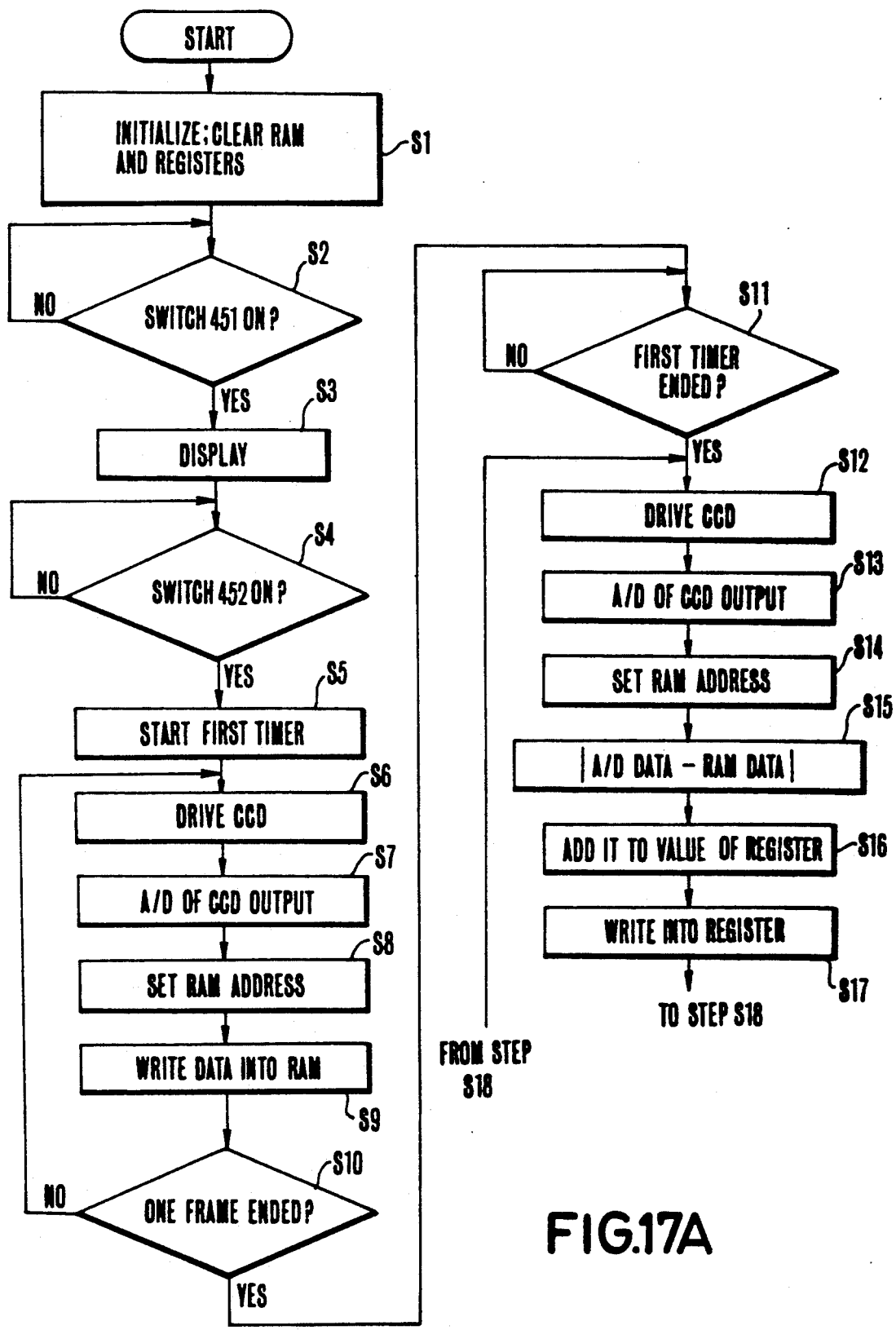
FIGS. 17A and 17B are a flowchart illustrating an example of the program for the control of the MPU 701 in the circuit of FIG. 16.
Figure 17B:
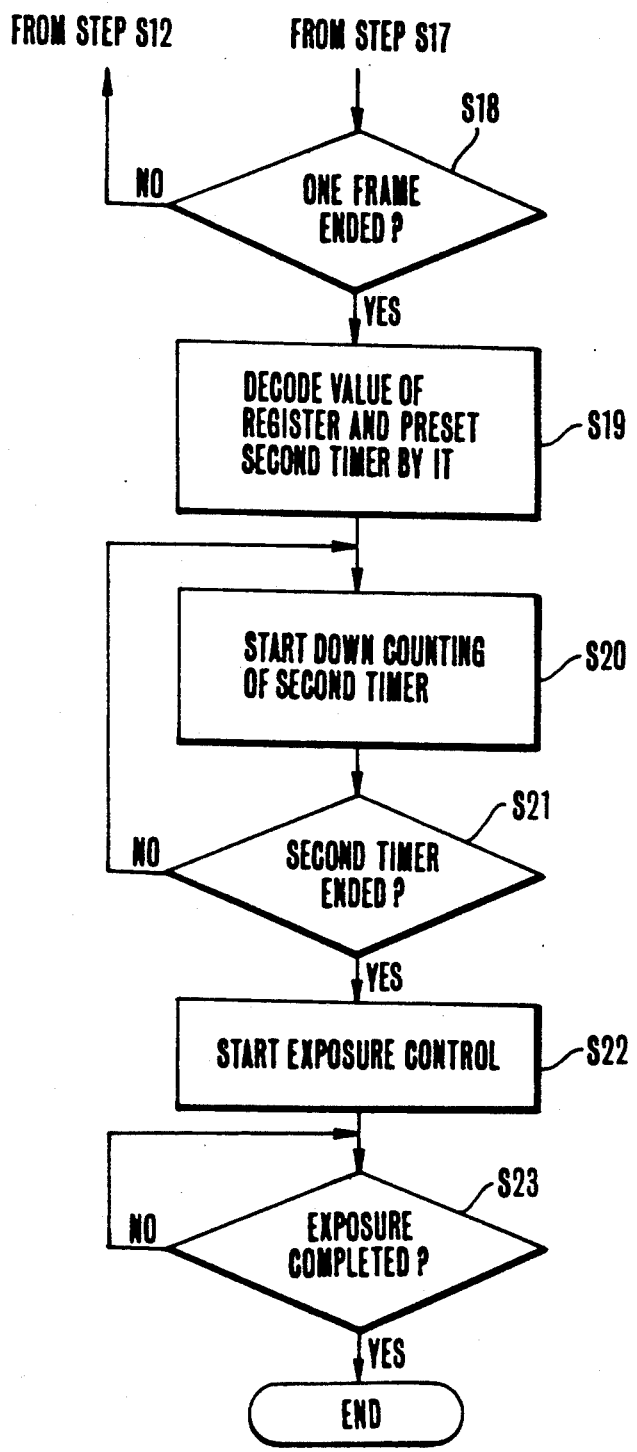

The RAM 701-3 is memory means for storing the image data, containing the variables to be used in the control program shown in FIGS. 17A and 17B, and playing the role of a counter.

FIGS. 17A and 17B show an example of the program for the control of the MPU 701 in this arrangement.

In FIG. 16 and FIGS. 17A and 17B, when the electrical power source of the camera body is thrown, the RAM 701-3 and registers AA-DD in the interior of the CPU 701-1 are cleared, and the other constituent parts are initialized (step S1).

Then, wait for depression of the release button 2 of FIG. 2. When the switch 451 turns ON, it permits the CCD 404 to be driven. The data of the picked-up image by the CCD 404 after having been converted to the digital form by the A/D converter 701-2 are displayed on the display means 3 through the display driver 3-2. The picked image continues being displayed until the switch 452 turns ON steps S2,-S3).

When the switch 452 turns ON, an initial value is set in the register AA which corresponds to the first timer 439 of FIG. 11, and counting of the reference clock is started (step S5). In the next step, the MPU 701 commands the CCD driver 432 again to drive the CCD 404, permitting the data for one frame of the picked image produced from the CCD 404 and A/D converted to be stored in the RAM 701-3. Along with this, the MPU 701 counts the passing time by the register AA (steps S6-S10).

When the counted time by the register AA has reached the prescribed value (step S11), the MPU 701 then commands the CCD driver 432 to drive the CCD 404. The image data of one frame obtained from the CCD 404 after having been converted to the digital signals are brought in a register BB within the CPU 701-1 (steps S12-S13).

Then, the CPU 701-1 reads out the image data which was stored in the RAM 701-3 in the step S14, and computes this stored data and image data stored in the register BB to obtain the absolute value of their difference for each picture element (steps S14-S15).

In a step S16, the absolute value of the difference of the above-described image data of each picture element is added to the content of the register CC. Subsequently, the procedure of the steps S12-S18 is repeated over for all the data of one frame of the picked image by the CCD 404 to obtain the total sum y of the differences of the image data of one frame.

When the total sum y of the differences of one frame of the picked image has been obtained, computation of $z = By$ (where B is the constant) is performed by the stored value of the total sum of the differences in the register CC. This computed value z is taken as the time to be counted by the second timer 437 and stored in a register DD (step S19).

Then, for each pulse of the reference clock, one unit time is subtracted from the content of the register DD. When the content of the register DD becomes 0, the MPU 701 sends an exposure start signal to the exposure control means 441, initiating an exposure of the film by the shutter drive means 443 (steps S20-S22). And, when the MPU 701 receives an exposure completion signal from the exposure control means 441 (step S23), the execution of this control program ends. Subsequently, each time the camera is shot, the execution of this control program is recycled to permit a photograph to be taken without the influence of hand shake. For note, though, in this embodiment, the image has been recorded on the photographic film, the recording may be made on, for example, the magnetic medium by converting the object image into electrical signals.

As has been described above, according to this embodiment, the amount of vibration of the camera resulting from the stroke operation of the shutter release which has a largest contribution to the cause of hand shake is detected when the release button is being pushed down, and determination of the shutter time lag is made automatically depending on the detected degree of image blur. Even if the photographer has little experience in shooting the camera, he can take photographs of good quality even if a hand shake takes place. Also, in the case of extreme hand shake, it is possible to hinder the shooting from further going to take the exposure. For this case, as the alarm of the hand shake is produced, the photographer may give up the shooting. This produces an advantage of saving that area of the film which would otherwise be wastefully used up.

Next, a third embodiment of the invention is described.

This embodiment is different from the first embodiment in that the value for of the shutter time lag for preventing the hand shake is determined with the light of the object to be photographed as a variable. The features other than this are similar to those of the first embodiment. So, for the purpose of simplicity, the next description is given only to the portions which are different from the first embodiment.

Figure 18:
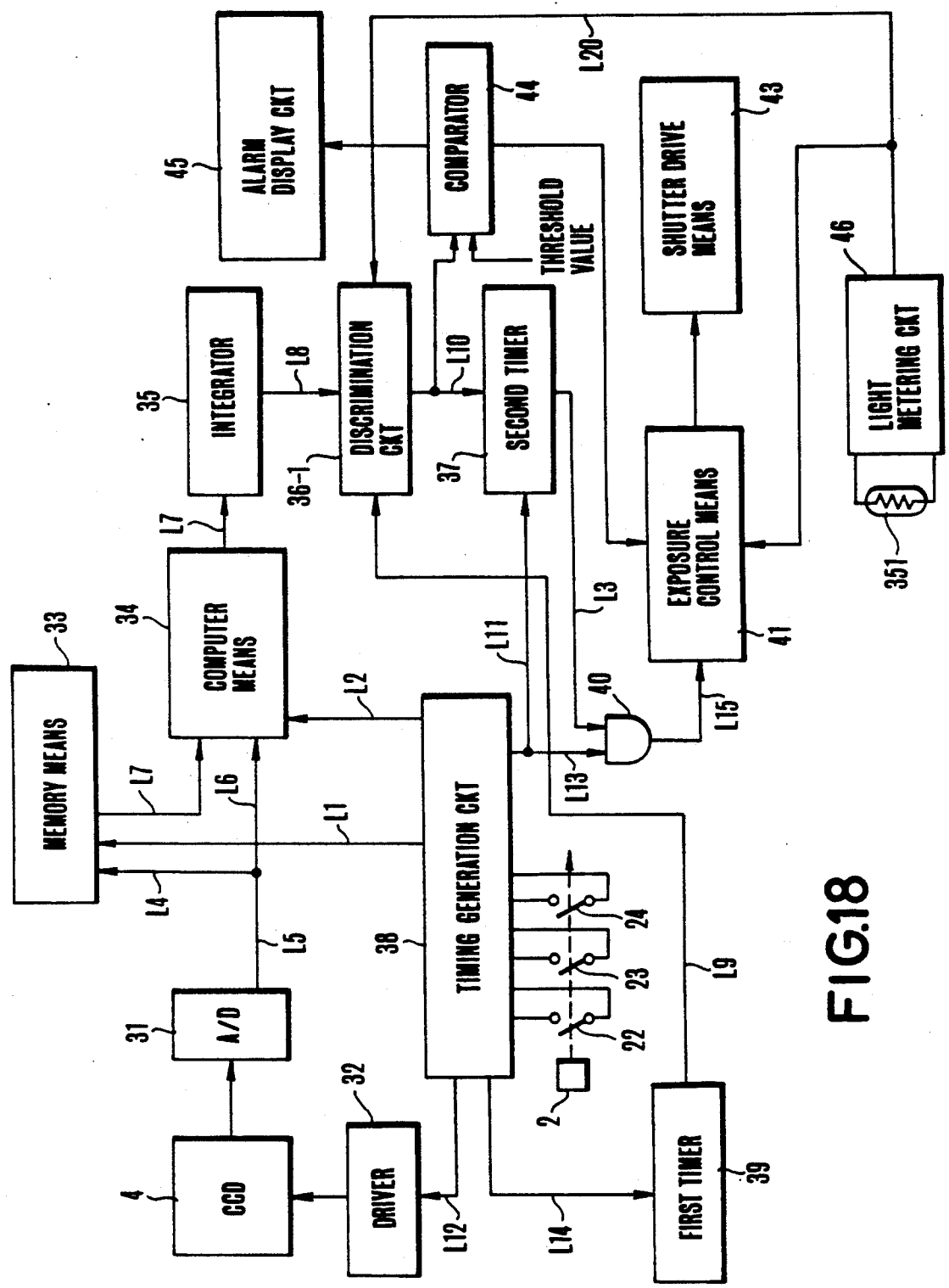
FIG. 18 is a block diagram illustrating an example of the circuit structure in a third embodiment of the invention.

FIG. 18 shows an example of the circuit structure in this embodiment. For note, the similar parts to those of FIG. 1 are denoted by the same reference characters.

The feature of FIG. 18 is that the time intervals from the "ON" of the switch 22 by the first stroke to the "ON" of the switch 23 by the second stroke and further to the "ON" of the switch 24 are counted by the first timer 39, and these counted times and the hand shake amount obtained by the integrator 35 are used in combination with the light value obtained from a light metering circuit 46 by a discrimination circuit 36-1 to set the shutter time lag or, in more detail, the delay time from the "ON" of the switch 24 to the start of opening of the shutter (not shown) to a value suited to the speed of the hand shake.

In FIG. 18, from the output of the integrator 35, the output of the first timer 39 representing the measured time and the output of the light metering circuit 46 representing the measured light value, enter the discrimination circuit 36-1.

Here, letting the sum of the hand shake amount computed by the integrator 35 be denoted by y, the time measured by the first timer from the "ON" of the switch 23 to the "ON" of the switch 24 by x, and the light value by w, the discrimination circuit 36-1 computes the shutter time lag z by, for example, $z = -Ax + By - Cw$, wherein A, B, C are constants determined from the photographic conditions.

For note, this method of determining the time lag z should be taken as an example. It is to be understood that the use of any of the other various functions in determining the time lag falls within the scope and spirit of the invention.

For shortening times x from the "ON" of the switch 23 to the "ON" of the switch 24, or release time lags x, as it implies that the pushing speed is faster, therefore, the hand shake is more apt to occur. Hence, the shutter time lag z is increased. The longer the release time lag x, the shorter the shutter time lag z becomes.

Also, the larger the hand shake amount y, the longer the shutter time lag z. Hence, the camera can wait for settlement of the hand shake. On the other hand, the smaller the hand shake amount y, the shorter the shutter time lag z becomes.

And, the brighter the photographic situation, the shorter the shutter time. In this case, the possibility of occurrence of a hand shake is lower. Hence, the shutter time lag becomes shorter. The thus-obtained shutter time lag z by the discrimination circuit 36-1 is set in the second timer 37. When the set value of the timer time (shutter time lag) is reached, the second timer 37 produces an output signal of low level in the timing F shown in FIG. 4 which is applied to the AND gate 40, initiating an exposure.

Figure 19:
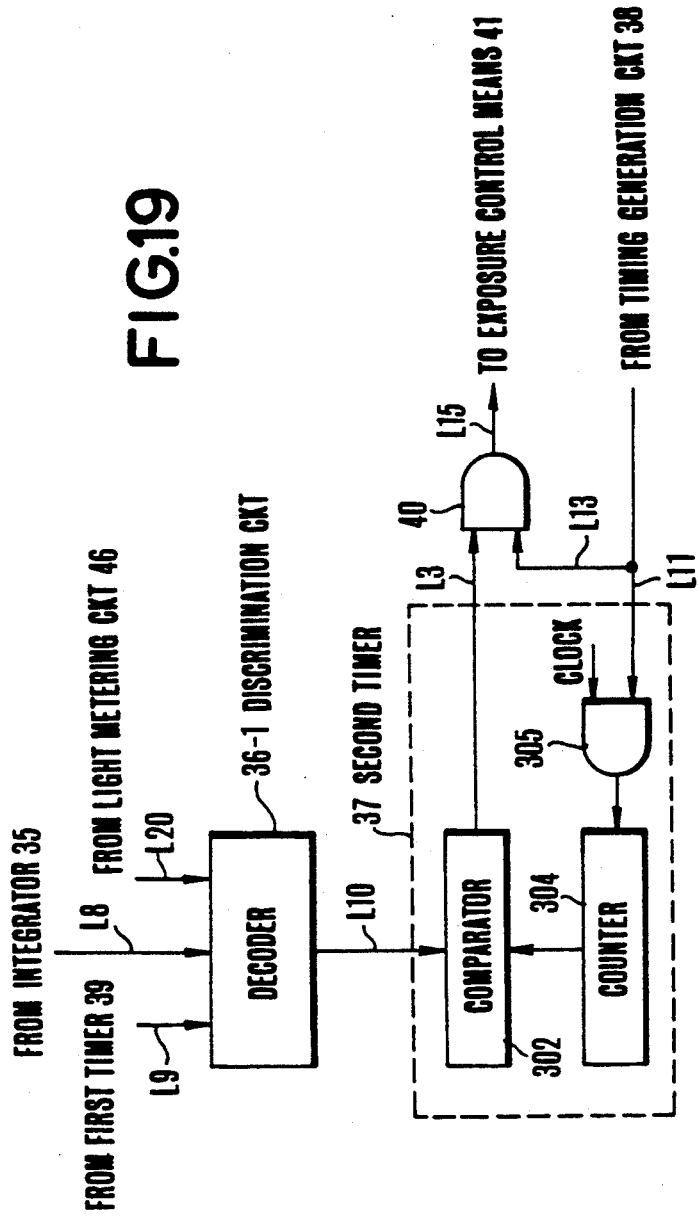
FIG. 19 is a block diagram of illustrating the structure of the discrimination circuit 36-1 and the second timer 37 in the circuit of FIG. 18.

FIG. 19 shows an example of the concrete construction and arrangement of the elements of the discrimination means 36-1 and second timer 37 in this embodiment. For note, the similar parts to those of FIG. 7 are denoted by the same reference characters.

In FIG. 19, 36-1 is a discrimination circuit utilizing a decoder. The output of the first timer 39 representing the stored time from the "ON" of the switch 23 to the "ON" of the switch 24, the output of the integrator 35 representing the degree of image blur (the hand shake amount) and the output of the light metering circuit 46 enter the decoder 36-1. The output of the decoder 36-1 representing the interval time from the "ON" of the switch 24 to the start of the exposure is applied to a comparator 302.

That is, when the measured time by the first timer 39 is long, as it implies that the shutter release button 2 has slowly been pushed down, the shutter time lag is short. Also, when the photographic situation is brighter, the shutter time lag becomes shorter. When the output of the integrator 35 is larger, as it implies that the image blur is larger, the shutter time lag is made larger. Such a correlation is schemed in the production of the output of the decoder 36-1 for the interval time is determined.

In this embodiment, while the decoder has been used in the discrimination circuit 36-1, a subtracter, an adder, a multiplier and others, or a ROM may otherwise be used in constructing the discrimination circuit 36-1 for producing the output representing the computed value based on the above-described equation $z = -Ax + By - Cw$. Here, A, B, C are the constants, x is the output value of the first timer 39, y is the output value of the integrator 35, and w is the output value of the light metering circuit 46.

Next, another arrangement of this embodiment is described.

Figure 20:
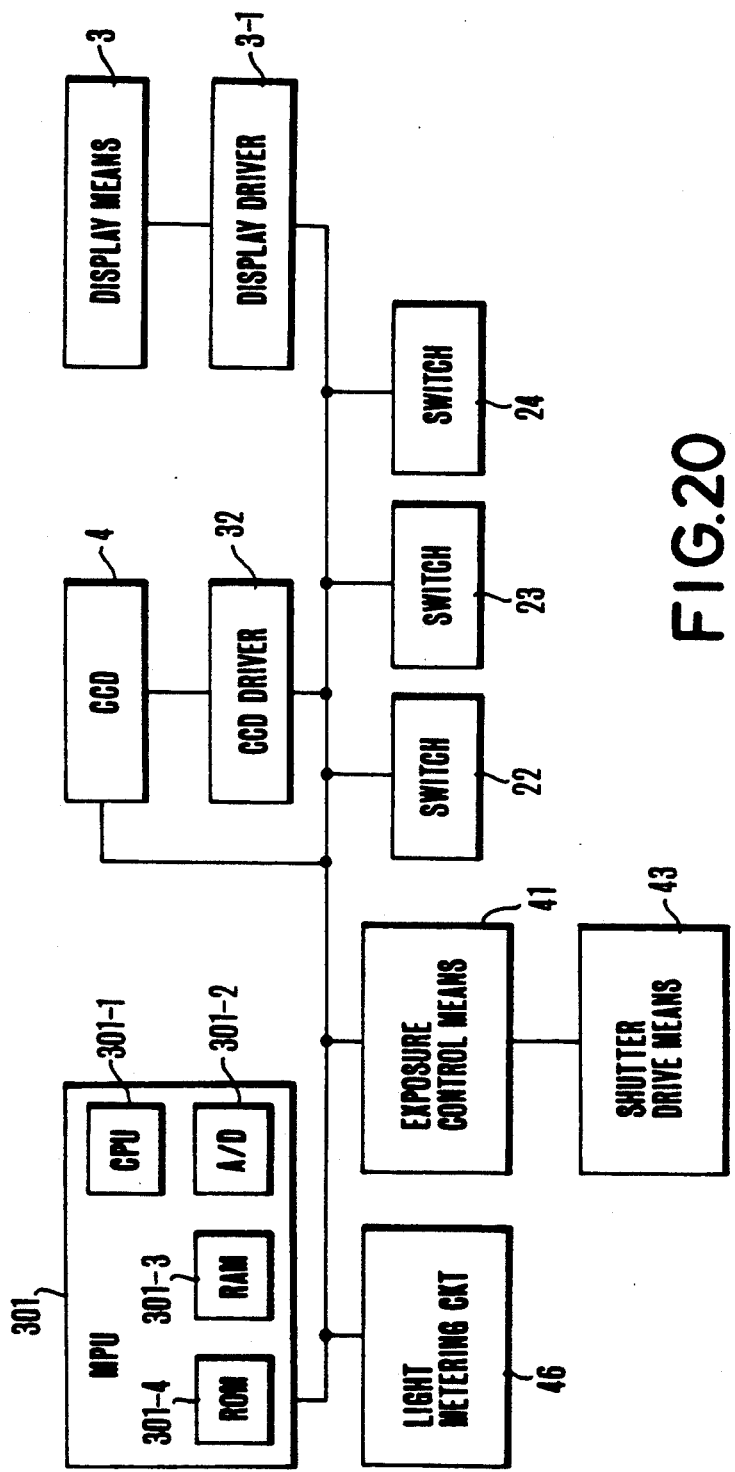
FIG. 20 is a block diagram illustrating another example of the circuit structure in the third embodiment of the invention.
Figure 21A:
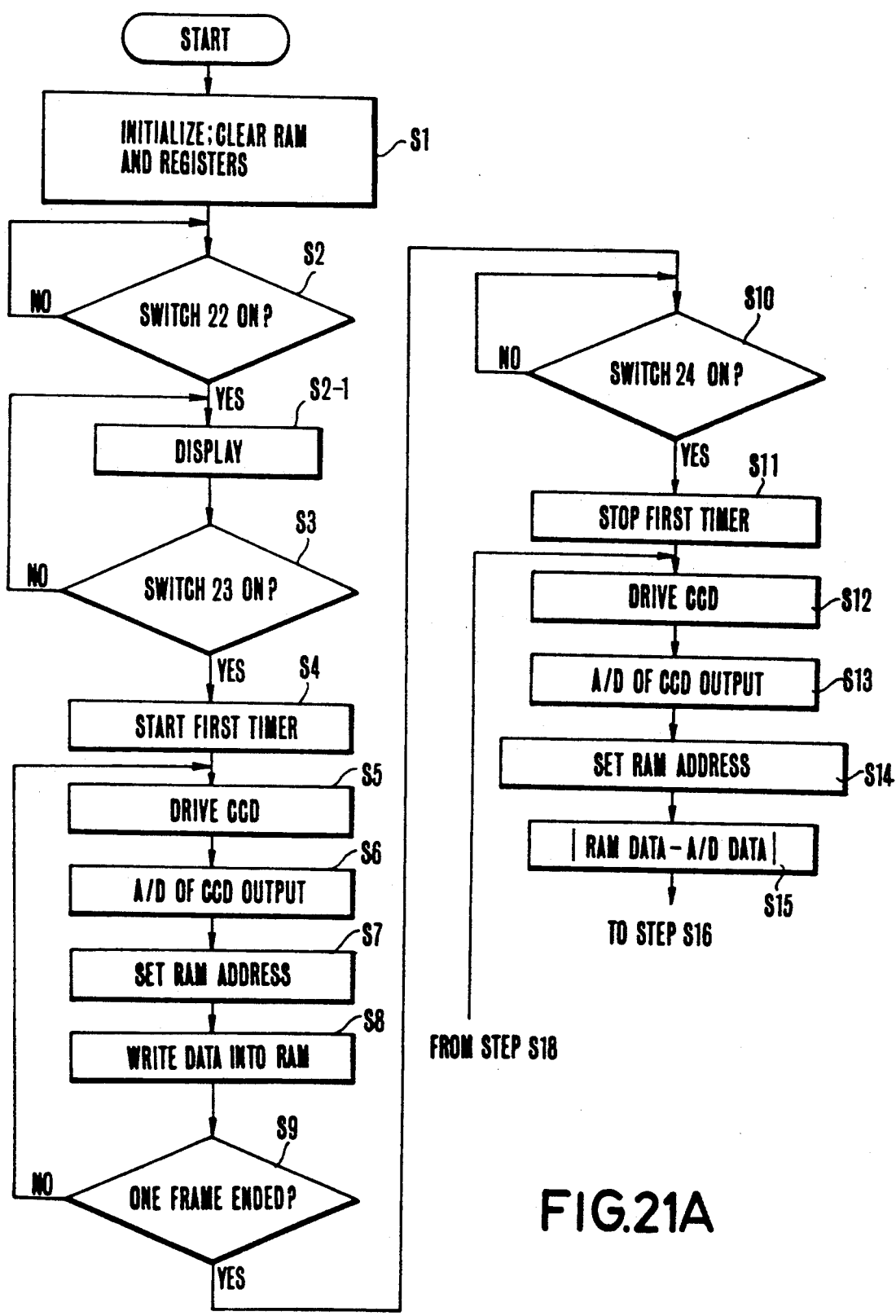
FIGS. 21A and 21B are a flowchart illustrating an example of the program for the control of the MPU 301 in the circuit of FIG. 20.
Figure 21B:
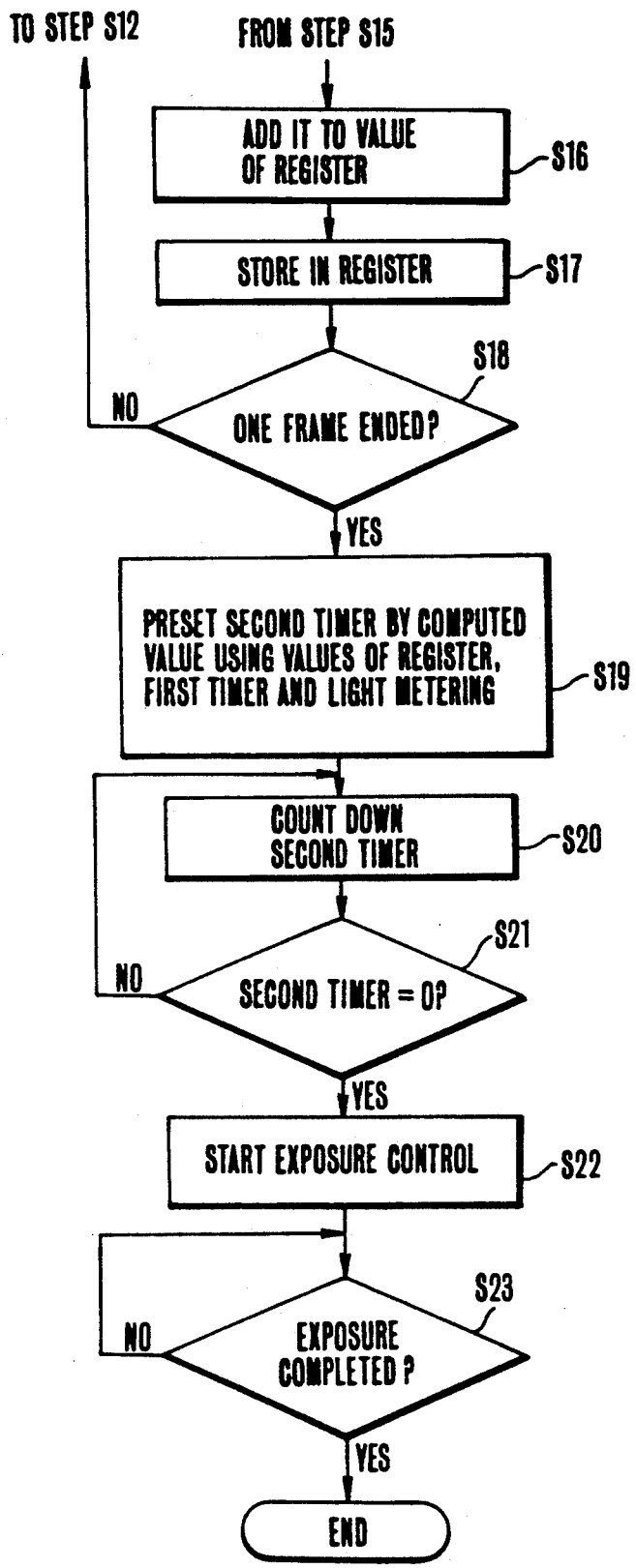

This arrangement exemplifies the use of a microcomputer (MPU) in performing the equivalent functions to those of the A/D converter 31, memory means 33, computer means 34, integrator 35, discrimination circuit 36-1 and first and second timers 39 and 37 in the foregoing arrangement fulfill. Its circuit structure is shown in FIG. 20. FIGS. 21A and 21B show an example of the program for the control of the MPU 301 in FIG. 20. For note, in FIGS. 20, 21A and 21B, the duplicates of FIGS. 9, 10A and 10B are denoted by the same reference numerals.

In FIG. 20, an A/D converter 301-2 converts the data of the picked image by the CCD 4 and the light value obtained from the light metering circuit 46 to digital form.

In FIGS. 21A and 21B, in a step S19, when the total sum y of the absolute values of the differences of the image data of one frame is obtained, the time value x stored in the register H, the value of the total sum y stored in the register J and the digitized light value w sent from the light metering circuit 46 are computed based on the equation $z = -Ax + By - Cw$. This computed value z is stored in the register K as the second timer 37 to set the delay time until the start of an exposure of the film.

As has been described above, according to this or third embodiment, determination of the time lag for recording the image is made depending on the object brightness. Therefore, the image blur is prevented from occurring, and the time lag can be shortened. Thus, photographs of good quality can be obtained. Also, in the case of extreme hand shake, the exposure operation is prohibited, and an alarm of the hand shake is done to enable the photographer to give up the shooting with an advantage of removing the wastefull consumption of film.

Next, a fourth embodiment of the invention is described.

This embodiment is different from the first embodiment in that the conditions under which the time of the shutter time lag for preventing the hand shake influence is determined include the object distance. The features other than this point are duplicate with the first embodiment therefore, for the purpose of simplicity, the next explanation is given only to the different parts from those of the first embodiment.

Figure 22:
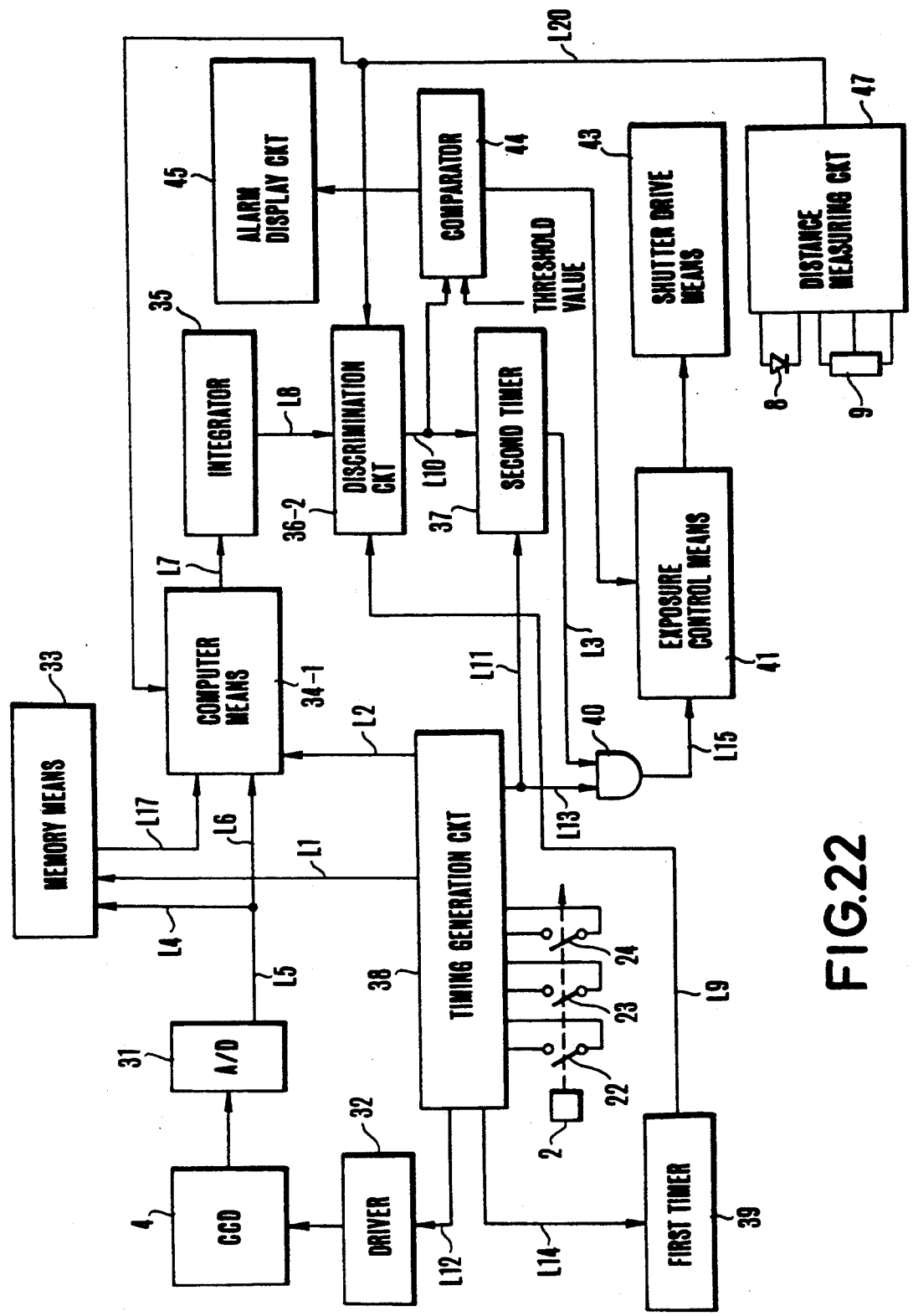
FIG. 22 is a block diagram illustrating an example of the circuit structure in a fourth embodiment of the invention.

FIG. 22 shows an example of the circuit structure in this embodiment. The similar parts to those of FIG. 1 are denoted by the same reference numerals.

In FIG. 22, the image data stored in the memory means 33 at the timing $E_1$ when the switch 23 turned on and the output of the A/D converter 31 which was produced at the timing $E_2$ are computed by computer means 34-1 to obtain the absolute values of their differences for those of the picture elements in the frame which lie in a blur sensing area whose size varies with variation of the object distance.

Figure 23A:
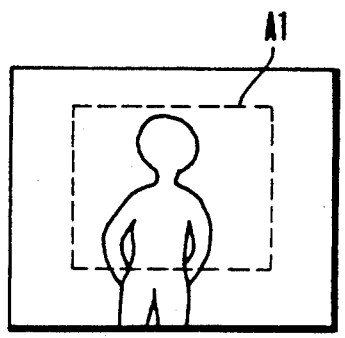
FIGS. 23A–23C are pictorial representations taken to explain the hand shake finding area in the image frame in the circuit of FIG. 22.
Figure 23B:
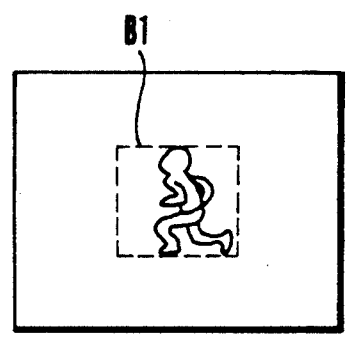
Figure 23C:
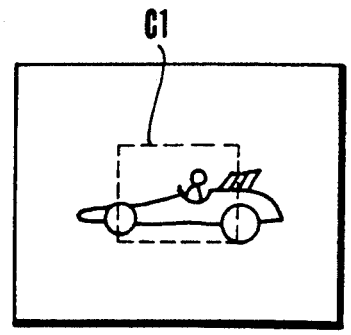

For example, in closeup photography as shown in FIG. 23A, the subject of principal photographic interest is imaged relatively large to the picture frame. Therefore, the image blur sensing area Al for which the difference is computed is set wider by the computer means 34-1. As the object distance increases, the size of the image blur sensing area is set progressively smaller as shown in FIGS. 23B, 23C. The absolute values of the differences for all those of the picture elements which lie within this image blur sensing area are summed up by the integrator 35. The indication for this computation is done from the timing generation circuit 38 through the signal line L2.

The output of the integrator 35, the output of the first timer 39 representing the measured time and the output of the distance measuring circuit 47 representing the measured value of the distance from the camera to the object to be photographed are computed by the discrimination circuit 36-2 to obtain the shutter time lag. Here, letting the sum of the hand shake amplitudes calculated by the integrator 35 be denoted by y, the time measured by the first timer 39 from the "ON" of the switch 23 to the "ON" of the switch 24 by x, and the measured object distance data by w, the discrimination circuit 36-2 calculates the shutter time lag z by $z = -Ax + W \cdot By$ where A, B and W are the positive constants determined from the photographic conditions.

Therefore, the shorter the time x from the "ON" of the switch 23 to the "ON" of the switch 24, or the release time lag x, the more apt the hand shake is to occur, and the longer the shutter time lag z is made. The longer the release time lag x, the shorter the shutter time lag z.

Also, the larger the hand shake amount y, the longer the shutter time lag z. Hence, the camera can wait for settlement of the hand shake. The smaller the hand shake amount y, the shorter the shutter time lag. Also, as the object distance decreases, the magnification of the subject increases as shown in FIG. 23A. In this case, even if the image is blurred by the hand shake, the influence is smaller than when the magnification of the image is smaller. Hence, the shorter the object distance, the shorter the shutter time lag is made.

The thus-computed value of the shutter time lag z by the computer means 34-1 is set in the second timer 37. When the set value of the timer time (shutter time lag) is reached, the second timer 37 produces an output signal of high level in the timing F shown in FIG. 4 which is then applied to the AND gate 40, initiating an exposure.

Figure 24:
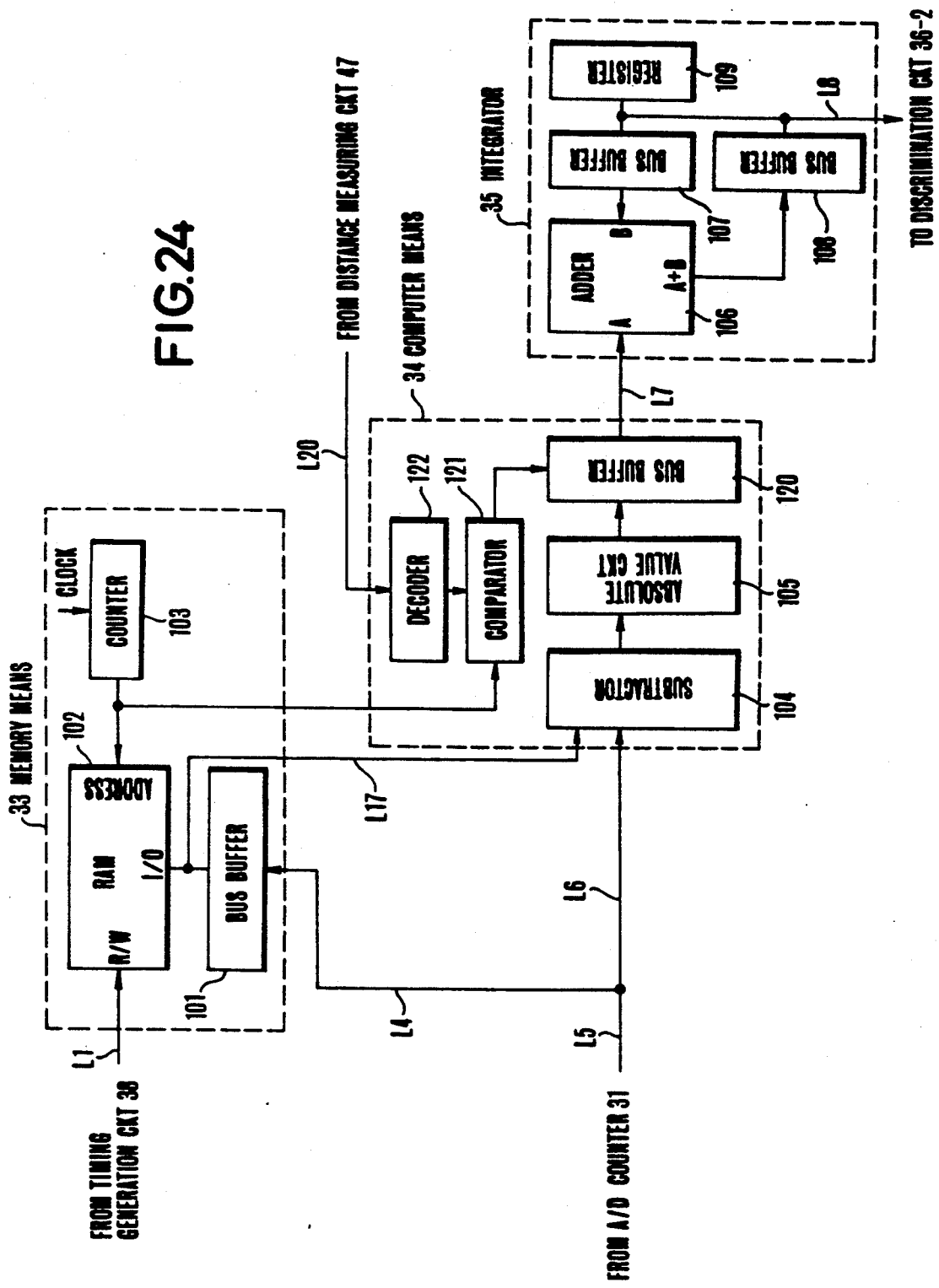
FIG. 24 is a block diagram of illustrating the concrete circuit structure of the main parts in the circuit of FIG. 22.

FIG. 24 shows an example of the concrete construction and arrangement of the elements of the main constituent parts in this embodiment. For note, the similar parts to those of FIG. 5 are denoted by the same reference numerals.

In FIG. 24, when the switch 24 turns ON, it is in this timing that the output for one picture frame of the A/D converter 31 and the output of the RAM 102 representing the stored data are computed by a subtracter 104 to obtain their difference for each picture element. By an absolute value circuit 105, the absolute value of the above-described difference or brightness difference is computed. For note, the counter 103 is receptive of the clock for counting up it. Its output not only becomes an address of the RAM 102, but also is applied to a comparator 121. Those of the output addresses which correspond to the area for calculating the difference whose size depends on the measured distance data sent from the distance measuring circuit 47 are determined by a decoder 122 and are applied to the comparator 121. Therefore, the comparator 121 can indicate a bus buffer 120 to transfer only the computed data of the area to be computed for the difference therefrom to an adder 106.

Also, the adder 106 in the interior of the integrator 35 adds the computed brightness difference data in the thus-limited area each in correspondence to the picked image position and produces an output which is applied through a bus buffer 108 to and stored in a register 109, and also to the discrimination circuit 36-2. For this reason, the total sum of the brightness differences over all the image blurring sensing area of the side depending on the object distance is obtained.

Figure 25:
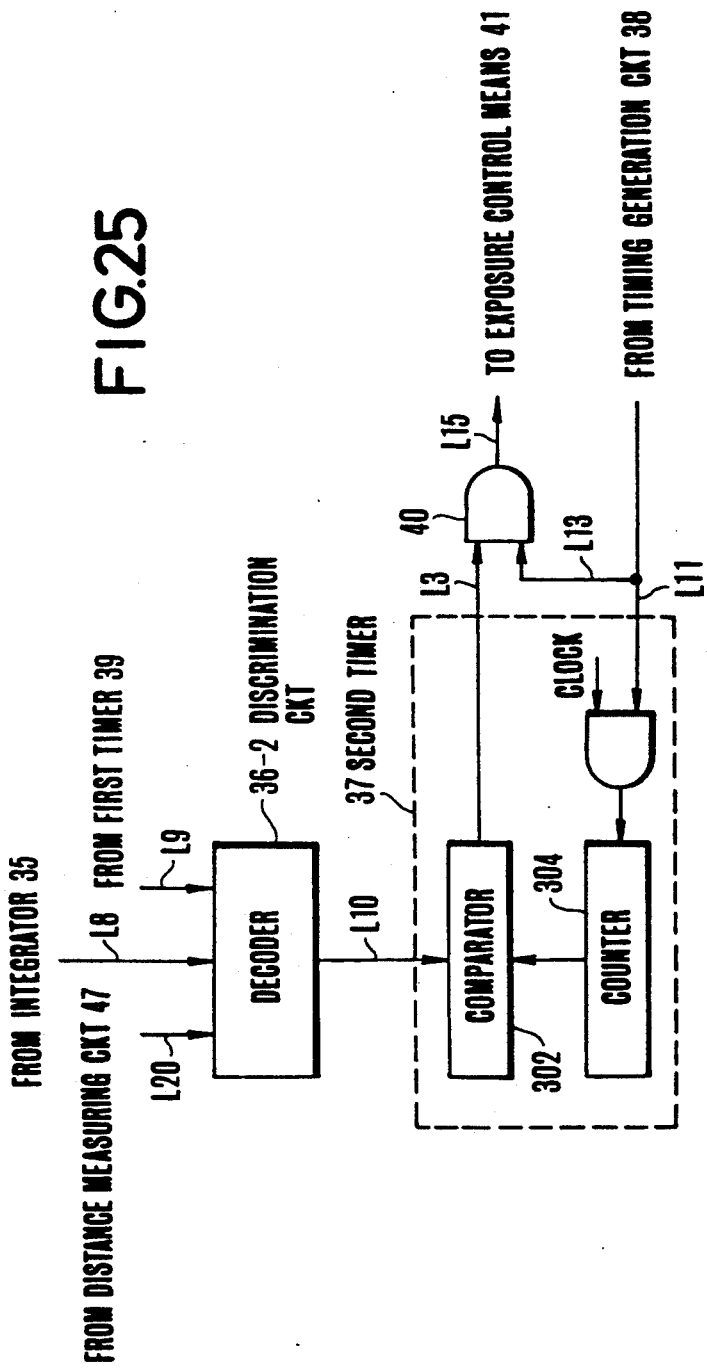
FIG. 25 is a block diagram of exemplifying the construction of the discrimination circuit 36-2 and the second timer 37 in the circuit of FIG. 22.

FIG. 25 shows an example of the concrete construction and arrangement of the elements of the discrimination circuit, 36-2 and second timer 37 in this embodiment. The similar parts to those of FIG. 7 are denoted by the same reference numerals.

In FIG. 25, 36-2 is discrimination means utilizing a decoder. The output of the first timer 39 representing the stored time from the "ON" of the switch 23 to the "ON" of the switch 24, the output of the integrator 35 representing the degree of image blur (the hand shake amount), and the output of the distance measuring circuit 47 enter the decoder 36-2. The output of the decoder 36-2 representing the interval time from the "ON" of the switch 24 to the start of an exposure is applied to a comparator 302.

That is, when the time measured by the first timer 39 is long, as it implies that the release button 2 has slowly been pushed down, the shutter time lag should be short. Also, when the object distance is long, as it implies that the magnification of the image of the object is generally small, and, therefore, the influence of the hand shake on the image sharpness is large, the shutter time lag should be long. When the output of the integrator 35 is large, as it implies that the image blur is large, the shutter time lag should be long. Such a correlation is schemed in the production of the output of the decoder 36-2 for the interval time is determined.

In this embodiment, while the decoder has been used in the discrimination circuit 36-2, a subtracter, an adder, a multiplier and others, or a ROM may be used in constructing the discrimination circuit 36-2 to perform computation based on the above-described equation $z = -Ax + W \cdot By$, where A, B are the constant, x is the output value of the first timer, y is the output value of the integrator 35 and w is the output value of the distance measuring circuit 47.

Figure 26:
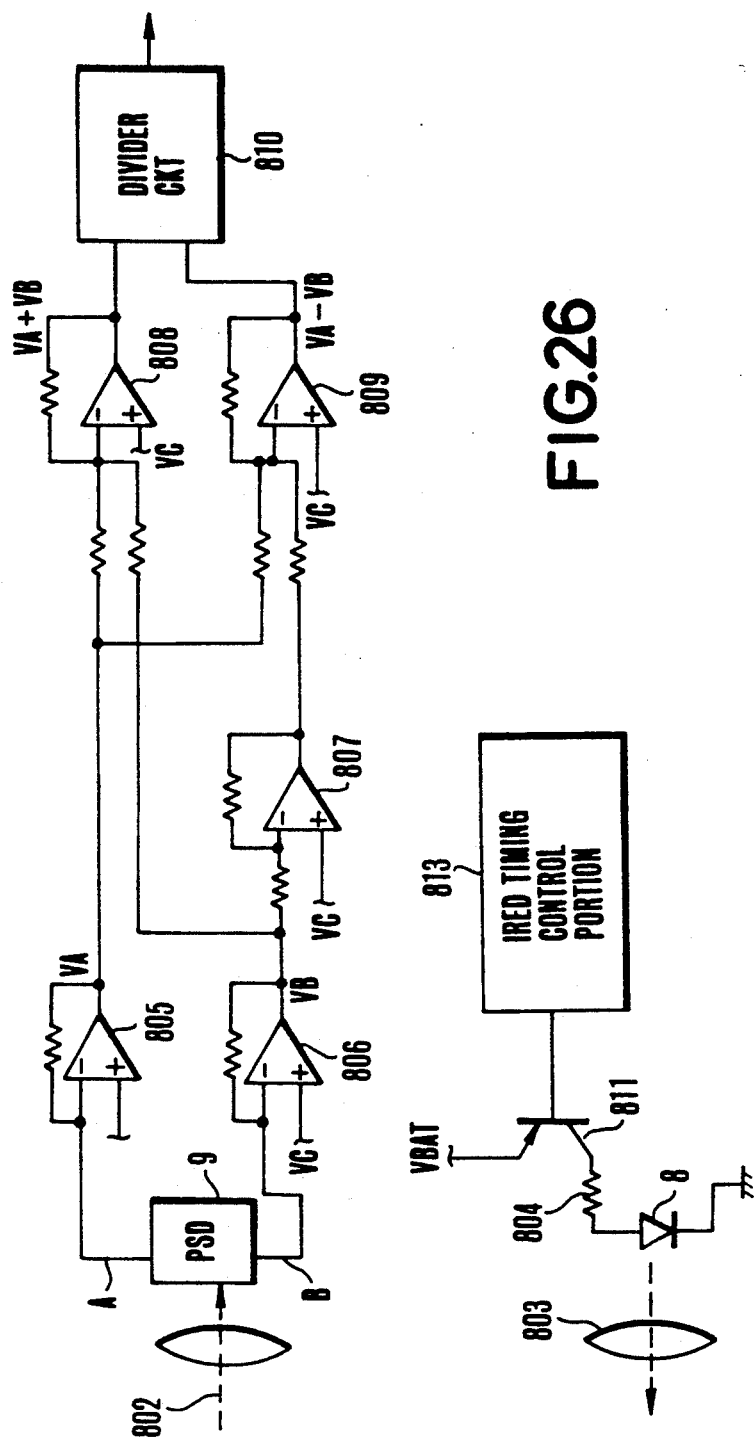
FIG. 26 is an electrical circuit diagram illustrating the construction of the distance measuring circuit in the circuit of FIG. 22.

FIG. 26 shows an example of the construction of the distance measuring circuit 47 in this embodiment.

In FIG. 26, a transistor 811 is controlled by an infrared light emitting element timing control portion 813, and an infrared light emitting element (IRED) 8 is turned on through a resistor 814. Infrared light is projected through a lens 803 onto an object to be photographed.

The reflection of this light enters through a lens 802 and is focused on the sensing surface of a photosensitive element (PSD) 9 as the position detecting element. Fractions of current depending on the position of the focused image flow from terminals A and B respectively. These currents are converted to voltages $V_A$ and $V_B$ by operational amplifiers 805 and 806 including resistors.

The voltage $V_B$ is inverted by an operational amplifier 807. These outputs are computed to obtain $V_A + V_B$ by an operational amplifier 808, and $V_A - V_B$ by another operational amplifier 809. A divider circuit 810 then computes $(V_A - V_B)/(V_A + V_B)$ and produces an output proportional to the object distance.

Next, another arrangement of this embodiment is described.

Figure 27:
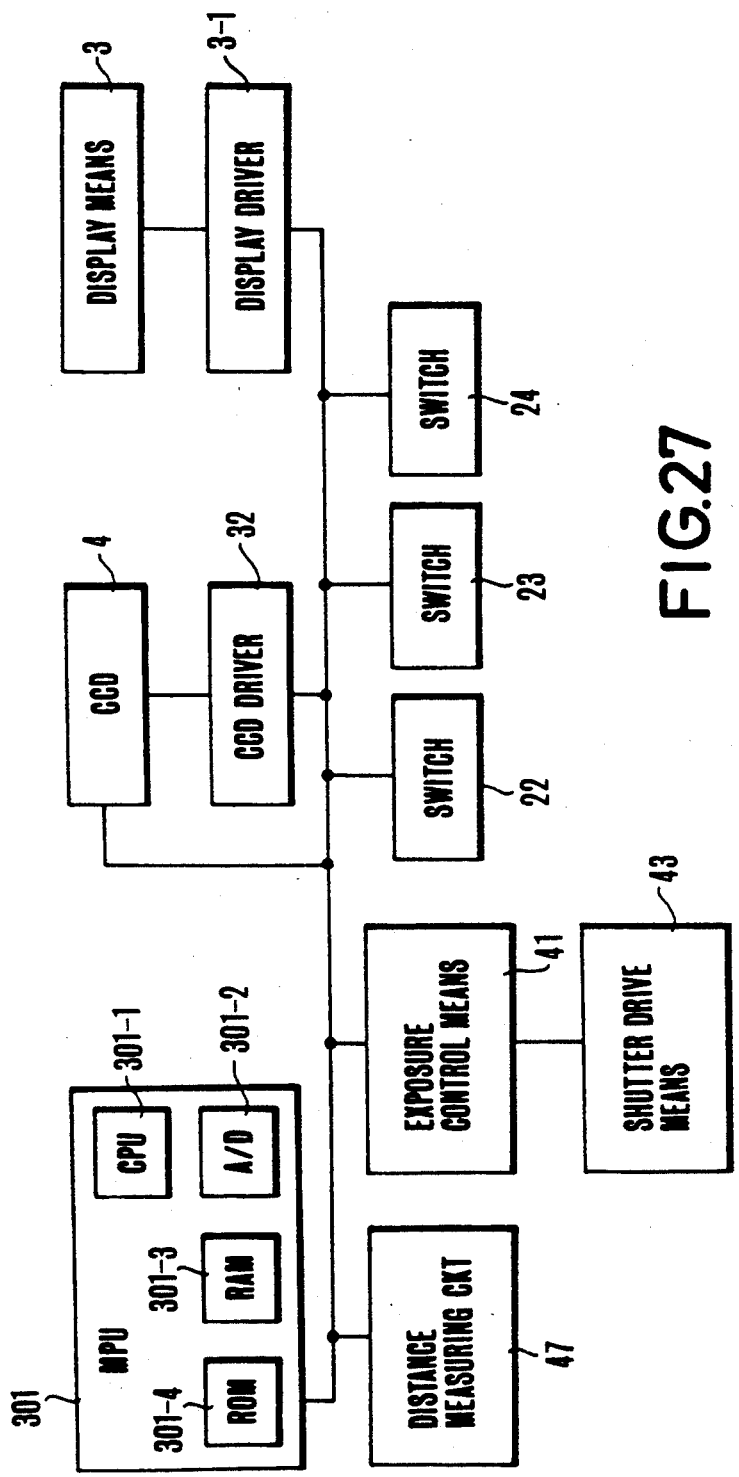
FIG. 27 is a block diagram illustrating another example of the circuit structure in the fourth embodiment of the invention.
Figure 28A:
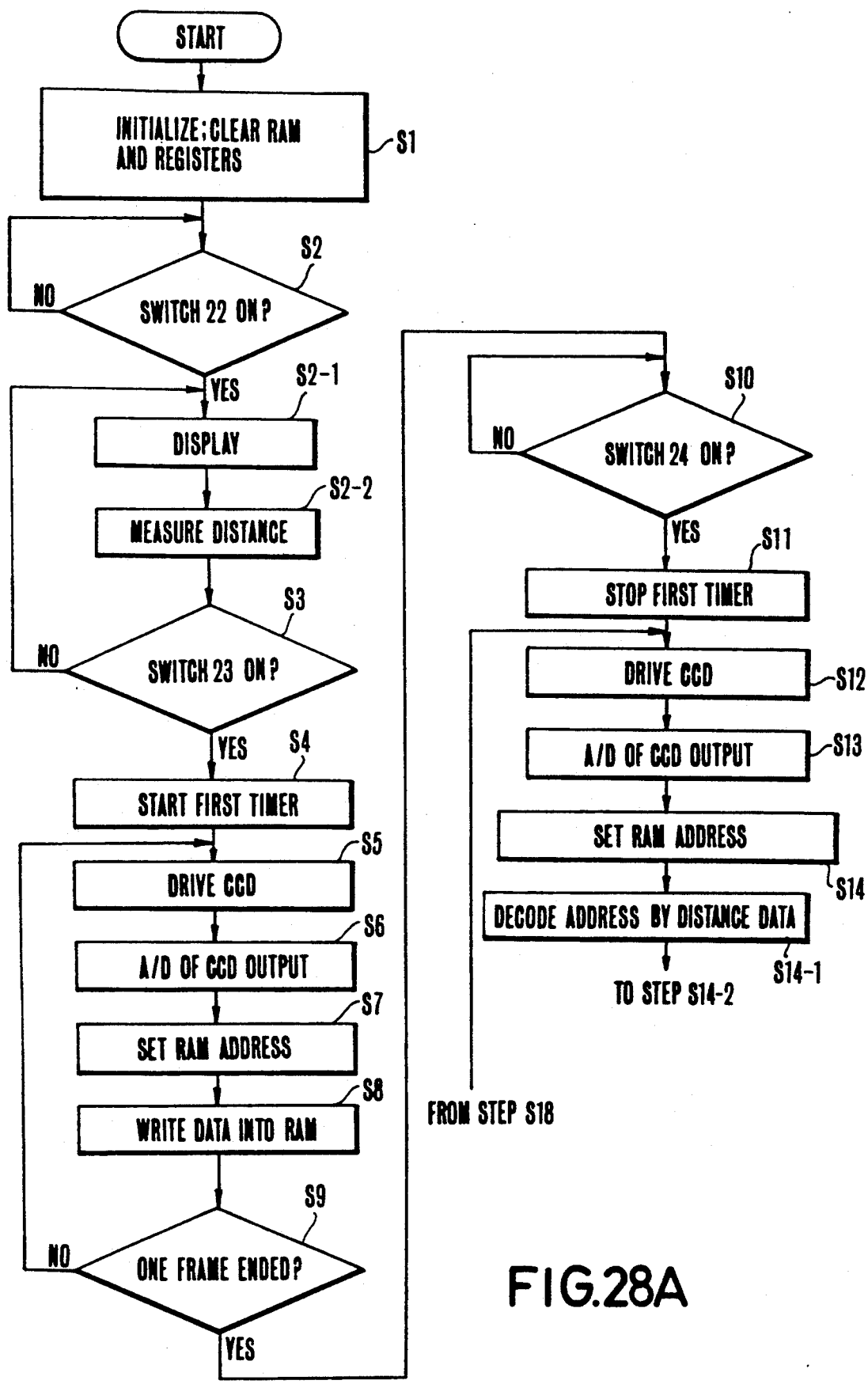
FIGS. 28A and 28B are a illustrating an example of the program for the control of the MPU 301 in the circuit of FIG. 27.
Figure 28B:
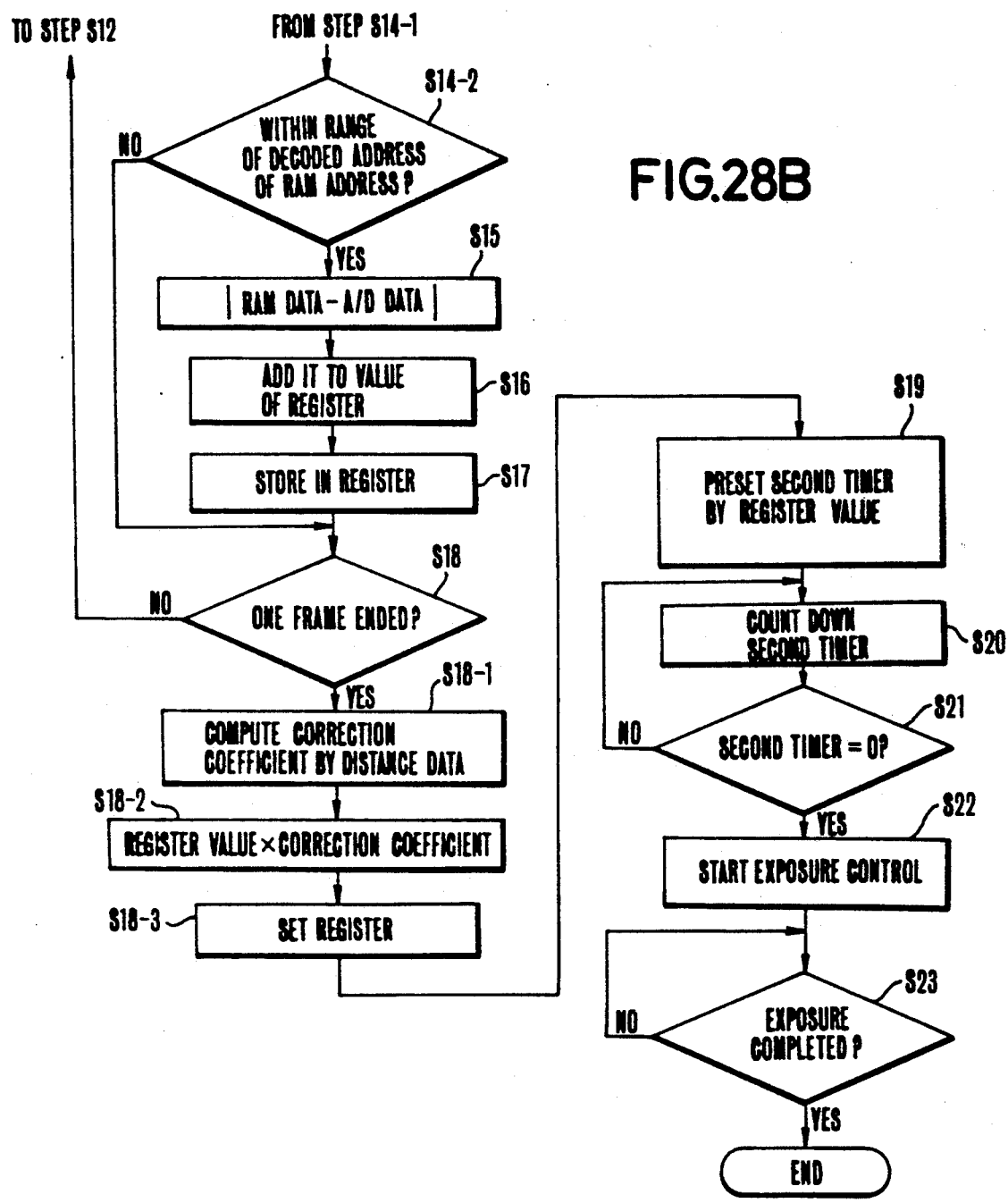

This arrangement exemplifies the use of a microcomputer (MPU) in performing the equivalent functions to those of the A/D converter 31, memory means 33, computer means 34-1, integrator 35, discrimination circuit 36-2 and first and second timers 39 and 37 in the arrangement of FIG. 22. Its circuit structure is shown in FIG. 27. FIGS. 28 and 28B show an example of the program for the control of the MPU 301. For note, in FIG. 27 and FIGS. 28A and 28B, the duplicates of the FIGS. 9 and 10 are denoted by the same reference numerals.

In FIG. 27, an A/D converter 301-2 converts the data of the picked image by the CCD 4 and the data of the measured distance by the distance measuring circuit 47 to the digital form.

In FIGS. 28A, in the steps S2-S3, after the depression of the release button 2 has been waited, when the switch 22 turns ON, the CCD 4 is driven. The data of the picked image by the CCD 4 is converted to the digital form by the A/D converter 301-2, and then displayed on the display means 3. On the other hand, the data of the measured distance by the distance measuring circuit 47 is written in a RAM 303-3. Such a display of the picked image and an alteration of the measured distance continue being performed until the switch 23 turns on.

In the steps S14-S15, the CPU 301-1 specifies those of the addresses of the RAM 301-3 which are to store the data to be computed in correspondence with the data of the measured distance stored in the RAM 301-3. Subsequently, the the image data within the specified range of addresses are read out and then computed with those of the image data in the register I which correspond to the positions of the read-out data to obtain the absolute values of the differences between the image data.

In the step S17, the absolute value of the difference of the image data corresponding to each other for each picture element is added to the content of the register J. Such a procedure of the steps S12-S18 is then repeated over for the data of the image in the set sensing area for image blur. The sum y of the differences of the image data is obtained and stored in the register J. Also, in steps S18-1 - S18-3, a correction coefficient W corresponding to the measured distance is computed and set in a register K'.

When the sum y of the differences of the picked image in the set area has been obtained in the step S19, the time value x stored in the register H, the value of the sum y of the differences contained in the register J, and the correction coefficient w contained in the register K' are then computed based on the equation: $z = -Ax + W \cdot By$. This computed value of the z is used as the time to be counted by the second timer 37 and is stored in a register L. Thus, the delay time until the start of an exposure of the film is set.

Though, in this or fourth embodiment, the equation: $z = -Ax + W \cdot By$ has been used in controlling the above-described time lag in accordance with the object distance, the present invention is not confined thereto. It is to be understood that the use of any of the various possible functions falls within the invention. Another example of variation is that the position of the image blur sensing area relative to the picture frame is changed depending on the object distance with the result that the above-described time lag changes.

As has been described above, according to the fourth embodiment, since the time lag for the start of an image recording is controlled in accordance with the object distance, for example, when the object to be photographed is far distant, the time lag is increased. When the object is close, it is shortened, thereby giving an advantage that the image can be recorded with little image blur.

For note, it is needless to say that the third and fourth embodiments may be combined with each other. Further, the detection of the hand shake amount in the third or fourth embodiment may otherwise be carried out by using such a method as used in the second embodiment and any other method.

As has been described above, according to the present invention, the electronic imaging apparatus is provided with image blur detecting means for detecting the blurring state of the image in response to the operation of the actuating means for starting picking-up of an image, and setting means responsive to the output of the image blur detecting means for setting the time which lasts until the start of an image recording, wherein the initiation of the image recording is deferred until the image blur resulting from the operation of the actuating means for starting the picking-up of the image settles. This produces an advantage that the influence of the hand shake on the image sharpness is simply prevented.

What is claimed is:

1. An imaging apparatus comprising:
    (A) actuating means for starting picking-up of an image;
    (B) image blur detecting means responsive to the operation of said actuating means for detecting the blurring state of the image; and
    (C) setting means responsive to the output of said image blur detecting means for setting a time which lasts until the start of an image recording.

2. An apparatus according to claim 1, further comprising speed detecting means for detecting the speed of movement of said actuating means, and wherein said setting means includes means responsive to the output of said speed detecting means for changing the time to be set.

3. An apparatus according to claim 1, wherein said image blur detecting means includes variation degree detecting means for detecting the degree of variation of the image between when in a first position of said actuating means and when in a second position thereof.

4. An apparatus according to claim 3, wherein said variation degree detecting means includes computer means for computing the sum of the brightness differences each for a picture element between the image in the first position of said actuating means and the image in the second position of said actuating means to obtain said degree of variation.

5. An apparatus according to claim 2, wherein said setting means includes means for increasing the time to be set as the speed detected by said speed detecting means increases.

6. An apparatus according to claim 1, wherein said setting means includes means for increasing the time to be set as the degree of image blur detected by said image blur detecting means increases.

7. An apparatus according to claim 6, further comprising speed detecting means for detecting the speed of movement of said actuating means, wherein said setting means includes means for increasing the time to be set as the speed detected by said speed detecting means increases.

8. An apparatus according to claim 1, further comprising alarm signal output means responsive to an output state of said image blur detecting means for producing an alarm signal.

9. An apparatus according to claim 1, wherein said image blur detecting means includes variation degree detecting means for detecting the degree of variation of the image between first and second times.

10. An apparatus according to claim 1, wherein said setting means includes means for changing the time to be set in response to light from an object to be photographed.

11. An apparatus according to claim 10, wherein said setting means includes means for shortening the time to be set in response to increase of the intensity of light from the object.

12. An apparatus according to claim 1, wherein said setting means includes means for changing the time to be set in response to the object distance.

13. An apparatus according to claim 12, wherein said setting means includes means for increasing the time to be set in response to increase of the object distance.

14. An apparatus according to claim 1, wherein said image blur detecting means includes means for changing the detecting area in response to change of the object distance.

15. An apparatus according to claim 14, wherein said image blur detecting means includes means for narrowing the detecting area of the image in response to increase of the object distance.

16. An apparatus according to claim 6, wherein said setting means includes means for shortening the time to be set in response to increase of the intensity of light from the object.

17. An apparatus according to claim 6, wherein said setting means includes means for increasing the time to be set in response to increase of the object distance.

18. An apparatus according to claim 9, wherein said variation degree detecting means includes computer means for computing the sum of the brightness differences each for a picture element between the image at said first time and the image at said second time to obtain said degree of variation.

19. An imaging apparatus, comprising:
(A) distance measuring means for measuring an object distance and providing object distance output; and
(B) hand-shake preventing means for preventing hand-shake influenced photography, said hand shake preventing means changing its operational manner in response to said output of said distance measuring means, said hand-shake preventing means including timer means for changing a time until a start of photographing in response to an output of said distance measuring means.

20. An apparatus according to claim 19, wherein said hand-shake preventing means includes means for increasing a degree of operation thereof in response to increasing of said object distance.

21. An imaging apparatus, comprising:
(A) distance measuring means for measuring an object distance and providing object distance output; and
(B) hand-shake detecting means for detecting a hand-shake influenced state of a picture image, said detecting means changing a zone of the picture image to be detected in response to said output of said distance measuring means.

22. An apparatus according to claim 21 wherein said hand-shake detecting means includes means for narrowing the zone of the picture image to be detected in response to increase of the object distance.

23. An apparatus for image recording or a camera comprising:
(A) image recording means for recording an image;
(B) blur detecting means for detecting a blur state;
(C) delay means for delaying a time when said image recording means starts recording the image in response to said blur detecting means;
(D) operation means for actuating said image recording means and said blur detecting means; and
(E) speed detecting means for detecting an operation speed of said operation means, and wherein said delay means includes means for changing the delay time in response to said speed detecting means.

24. An apparatus or a camera according to claim 23, wherein said delay means includes means for increasing the delay as the operation speed detected by said speed detecting means increases.

25. An apparatus or a camera according to claim 23, wherein said blur detecting means includes variation degree detecting means for detecting a degree of variation of the image between when in a first state of said operation means and when in a second state thereof.

26. An apparatus or a camera according to claim 25, wherein said variation degree detecting means includes computer means for computing a sum of the brightness differences for an image picture element between the image in the first state of said operation means and the image in the second state of said operation means to obtain said degree of variation.

27. An apparatus for image recording or a camera comprising:
(A) image recording means for recording an image;
(B) blur detecting means for detecting a blur stage; and
(C) delay means for delaying a time when said image recording means starts recording the image in response to said blur detecting means, said blur detecting means including variation degree detecting means for detecting a degree of variation of the image between a first time and a second time.

28. An apparatus or a camera according to claim 27 further comprising operation means for actuating said image recording means and said blur detecting means.

29. An apparatus or a camera according to claim 28, wherein said operation means is arranged to actuate both said image recording means and said blur detecting means in a predetermined operation state of said operation means.

30. An apparatus or a camera according to claim 29, wherein said blur detecting means includes means for performing the blur detecting operation a predetermined time after said operation means is operated in said predetermined operation state.

31. An apparatus or a camera according to claim 29, wherein said blur detecting means includes variation degree detecting means for detecting a degree of variation of the image between a time when said operation means is operated in the predetermined operation state and a time thereafter.

32. An apparatus or a camera according to claim 27, wherein said blur detecting means includes means for performing the blur detecting operation for a predetermined time.

33. An apparatus or a camera according to claim 27, wherein said delay means includes means for increasing the delay time as a degree of blur detected by said blur detecting means increases.

34. An apparatus or a camera according to claim 27, further comprising alarm signal output means producing an alarm signal, in response to said blur detecting means.

35. An apparatus or a camera according to claim 34, wherein said alarm signal output means includes means for producing said alarm signal in response to said blur detecting means detecting the blur state to be more than a predetermined value.

36. An apparatus or a camera according to claim 27, wherein said delay means includes means for changing the delay time in response to light from an object.

37. An apparatus or a camera according to claim 36, wherein said delay means includes means for shortening the delay in response to an increase of the intensity of light from the object.

38. An apparatus or a camera according to claim 27, wherein said delay means includes means for changing the delay time in response to an object distance.

39. An apparatus or a camera according to claim 38, wherein said delay means includes means for increasing the delay time in response to an increase of the object distance.

40. An apparatus or a camera according to claim 27, wherein said blur detecting means includes means for changing a detecting area of the image in response to a change of an object distance.

41. An apparatus or a camera according to claim 40, wherein said blur detecting means includes means for narrowing the detecting area in response to an increase of the object distance.

42. An apparatus or camera according to claim 27, wherein said variation degree detecting means includes computer means for computing the sum of the brightness differences for an image picture element between the image at said first time and the image at said second time to obtain said degree of variation.

43. An apparatus for image recording or a camera, comprising:
   (A) distance measuring means for measuring an object distance;
   (B) blur preventing means for preventing a blur image from being recorded, said blur preventing means changing in its operation manner in response to said distance measuring means, said blur preventing means including means for increasing a degree of operation of said blur preventing means in response to an increase of the object distance; and
   (C) light detecting means for detecting light from the object, and wherein said blur preventing means includes means for decreasing a degree of operation of said blur preventing means in response to an increase in the intensity of the light form the object.

44. A blur detecting apparatus or a camera, comprising:
   (A) distance measuring means for measuring an object distance; and
   (B) blur detecting means for detecting a blur state of an image, said blur detecting means changing a range of the image to be detected in response to said distance measuring means.

45. An apparatus or a camera according to claim 44, wherein said blur detecting means includes means for narrowing the range of the image to be detected in response to an increase of the object distance.

46. An apparatus for image recording or a camera comprising:
   (A) image recording means for recording an image;
   (B) operation means for actuating said image recording means;
   (C) speed detecting means for detecting an operation speed of said operation means; and
   (D) blur preventing for preventing a blur image from being recorded, said blur preventing means changing a degree of operation of said blur preventing means in response to said speed detecting means.

47. An apparatus or a camera according to claim 46, wherein blur preventing means includes means for increasing a degree of operation of said blur preventing means as the speed detected by said speed detecting means increases.

48. An apparatus according to claim 46, wherein said blur preventing means includes timer means for changing a time until a start of recording the image in response to said speed detecting means.

49. An apparatus or a camera according to claim 48, wherein said timer means includes means for increasing the time until the start of recording the image as the speed detected by said speed detecting means increases.

* * * * *

UNITED STATES PATENT AND TRADEMARK OFFICE
CERTIFICATE OF CORRECTION

PATENT NO. : 5,307,113
DATED : April 26, 1994
INVENTOR(S) : Akira Egawa

It is certified that error appears in the above-indentified patent and that said Letters Patent is hereby corrected as shown below:

```
Col. 1, Line 34 change "errect" to --effect--
Col. 1, Line 37 after "up" insert --with--
Col. 1, Line 52 delete "up" and after "start" insert --up--
Col. 1, Line 65 delete "of"
Col. 2, Line 9  delete "of"
Col. 2, Line 18 delete "a" and change "flowchart" to --flowcharts--
Col. 2, Line 27, 29, 32 delete "of"
Col. 2, Line 38 delete "a" and change "flowchart" to --flowcharts--
Col. 2, Line 45 delete "of"
Col. 2, Line 51 delete "a" and change "flowchart" to --flowcharts--
Col. 2, Lines 60, 63 delete "of"
Col. 3, Line 4 delete "a" and insert --flowcharts-- after "are"
Col. 4, Line 22 after "makes" insert --the--
Col. 4, Line 41 change "23'" to --23,--
Col. 4, Line 42 change "33'" to --33,--
Col. 6, Line 43 after "of" insert --an--
Col. 7, Line 18 after "of" insert --a-
Col. 7, Line 41 change " ln" to --$\ell$n--
Col. 7, Line 52 change " ln" to --$\ell$n-- (two occurrences)
Col. 7, Line 55 change " ln" to --$\ell$n--
Col. 7, Line 58 change " ln" to --$\ell$n-- (two occurrences)
Col. 8, Line 7 delete "of"
Col. 8, Line 28 after "301-3" insert --which--
Col. 8, Lines 30, 32 change "10A," to --10A and--
Col. 8, Line 34 change "FIGS.9 and 10A," to --FIGS.9, 10A and--
Col. 8, Line 39 After "Then," insert --there is a--
Col. 8, Line 40 change "ON" to --"ON"--
Col. 10, Line 13 after "An" insert --AND--
Col. 10, Line 23 after "embodiment" insert --,--
Col. 10, Line 37 delete ","
Col. 11, Line 58 delete "in"
Col. 13, Line 32 after "Then" insert --there is a wait--
```

UNITED STATES PATENT AND TRADEMARK OFFICE
CERTIFICATE OF CORRECTION

PATENT NO. : 5,307,113
DATED : April 26, 1994
INVENTOR(S) : Akira Egawa

It is certified that error appears in the above-indentified patent and that said Letters Patent is hereby corrected as shown below:

```
Col. 13, Lines 33, 39, 40 change "ON" to --"ON"--
Col. 14, Line 44 delete "of"
Col. 16, Line 10 delete "fulfill"
Col. 16, Line 30 after "or" insert --the--
Col. 16, Line 48 after "embodiment" insert --;--
Col. 17, Line 19 change "W.By" to --W·By--
Col. 17, Line 51 Change "ON" to --"ON"--
Col. 17, Line 59 change "up it" to --it up--
Col. 18, Line 43 change "W.By." to -- W·By.--
Col. 19, Line 20 change "ON" to --"ON"--
Col. 19, Line 32 delete "the" (first occurrance)
Col. 19, Line 53 change "W.By." to --W·By.--
Col. 19, Line 57 after "or" insert --the--
Col. 19, Line 58 change "W.By" to --W·By--
```

Signed and Sealed this

Twenty-fifth Day of October, 1994

Attest:

BRUCE LEHMAN

Attesting Officer     Commissioner of Patents and Trademarks